United States Patent
Du et al.

(10) Patent No.: US 12,010,560 B2
(45) Date of Patent: Jun. 11, 2024

(54) RESOURCE RESERVATION METHOD AND RELATED DEVICE

(71) Applicant: Huawei Technologies Co., Ltd., Shenzhen (CN)

(72) Inventors: Zhenguo Du, Shenzhen (CN); Hongcheng Zhuang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 502 days.

(21) Appl. No.: 17/423,007

(22) PCT Filed: Nov. 20, 2019

(86) PCT No.: PCT/CN2019/119571
§ 371 (c)(1),
(2) Date: Jul. 14, 2021

(87) PCT Pub. No.: WO2020/151350
PCT Pub. Date: Jul. 30, 2020

(65) Prior Publication Data
US 2022/0104076 A1 Mar. 31, 2022

(30) Foreign Application Priority Data

Jan. 23, 2019 (CN) .......................... 201910082801.X
May 31, 2019 (CN) .......................... 201910478882.5

(51) Int. Cl.
*H04W 28/26* (2009.01)
*H04W 72/04* (2023.01)
(Continued)

(52) U.S. Cl.
CPC ....... *H04W 28/26* (2013.01); *H04W 72/0446* (2013.01); *H04W 72/0453* (2013.01); *H04W 72/0466* (2013.01)

(58) Field of Classification Search
CPC ............ H04W 28/26; H04W 72/0446; H04W 72/0453; H04W 72/0466
(Continued)

(56) References Cited

U.S. PATENT DOCUMENTS

| 7,885,287 B2 | 2/2011 | Bachrach et al. |
| 2015/0172012 A1 | 6/2015 | Abeysekera et al. |

(Continued)

FOREIGN PATENT DOCUMENTS

| CN | 105101223 A | 11/2015 |
| CN | 106465429 A | 2/2017 |

(Continued)

OTHER PUBLICATIONS

IEEE Std 802.11-2016, "IEEE Standard for Information technology, Telecommunications and information exchange between systems Local and metropolitan area networks, Specific requirements, Part 11: Wireless LAN Medium Access Control (MAC) and Physical Layer (PHY) Specifications," 2016, 3534 pages.

(Continued)

*Primary Examiner* — Gbemileke J Onamuti
(74) *Attorney, Agent, or Firm* — Conley Rose, P.C.

(57) ABSTRACT

A resource reservation method includes that a network device generates a resource reservation request message (RRQ), where the RRQ includes one first RRQ (RRQ 1) and N second resource RRQs (RRQs 2), the RRQ 1 includes information indicating that a time for which the network device occupies a target channel is first duration, the N RRQs 2 are in a one-to-one correspondence with N user equipments (UEs) and request the N UEs to transmit data to the network device in the first duration, and N>1.

20 Claims, 10 Drawing Sheets

(51) Int. Cl.
*H04W 72/044* (2023.01)
*H04W 72/0446* (2023.01)
*H04W 72/0453* (2023.01)

(58) Field of Classification Search
USPC ........................................................ 370/329
See application file for complete search history.

(56) References Cited

U.S. PATENT DOCUMENTS

| | | |
|---|---|---|
| 2015/0201401 A1 | 7/2015 | Lahetkangas et al. |
| 2015/0351121 A1 | 12/2015 | Luo et al. |
| 2016/0227578 A1 | 8/2016 | Lee et al. |
| 2017/0055290 A1 | 2/2017 | Lv et al. |
| 2017/0104563 A1 | 4/2017 | Lee et al. |
| 2017/0111889 A1 | 4/2017 | Li et al. |
| 2017/0142694 A1 | 5/2017 | Yerramalli et al. |
| 2017/0208627 A1 | 7/2017 | You et al. |
| 2017/0303280 A1 | 10/2017 | Chun et al. |
| 2018/0213558 A1 | 7/2018 | Kim et al. |
| 2018/0343588 A1 | 11/2018 | Sadek et al. |
| 2019/0007973 A1 | 1/2019 | Lou et al. |

FOREIGN PATENT DOCUMENTS

| | | |
|---|---|---|
| CN | 106954273 A | 7/2017 |
| CN | 107113885 A | 8/2017 |
| CN | 108353404 A | 7/2018 |
| CN | 108476513 A | 8/2018 |
| CN | 109041249 A | 12/2018 |
| CN | 110225556 A | 9/2019 |
| IN | 108476530 A | 8/2018 |
| JP | 2017530588 A | 10/2017 |
| JP | 2020522163 A | 7/2020 |
| WO | 2017127126 A1 | 7/2017 |
| WO | 2017131860 A1 | 8/2017 |
| WO | 2018106380 A1 | 6/2018 |

OTHER PUBLICATIONS

Intel Corporation, "Evaluation results on Wi-Fi RTS/CTS," 3GPP TSG RAN WG1 Meeting #80, R1-150503, Athens, Greece, Feb. 9-13, 2015, 4 pages.

Huawei, et al., "UL transmission in preconfigured resource," 3GPP TSG RAN WG1 Meeting #94bis, R1-1810089, Chengdu, Oct. 8-12, 2018, 6 pages.

IEEE P802.11ax/D3.2, "Draft Standard for Information technology, Telecommunications and information exchange between systems Local and metropolitan area networks, Specific requirements, Part 11: Wireless LAN Medium Access Control (MAC) and Physical Layer (PHY) Specifications, Amendment 1: Enhancements for High Efficiency WLAN," Oct. 2018, 698 pages.

RESOURCE RESERVATION METHOD AND RELATED DEVICE

CROSS-REFERENCE TO RELATED APPLICATIONS

This is a U.S. National Stage of International Patent Application No. PCT/CN2019/119571 filed on Nov. 20, 2019, which claims priority to Chinese Patent Application No. 201910082801.X filed on Jan. 23, 2019 and Chinese Patent Application No. 201910478882.5 filed on May 31, 2019, all of which are hereby incorporated by reference in their entireties.

TECHNICAL FIELD

The present invention relates to the field of communications technologies, and in particular, to a resource reservation method and a related device.

BACKGROUND

With the rapid increase of a wireless data traffic volume, it is difficult for a licensed (Licensed) spectrum to satisfy a spectrum requirement for communication. Accordingly, technologies for transmitting data by using an unlicensed spectrum resource emerge, for example, a licensed assisted access (licensed assisted access, LAA) technology, an enhanced licensed assisted access (enhanced licensed assisted access, eLAA) technology, and a new radio-unlicensed (new radio-unlicensed, NR-U) technology.

However, unlicensed frequency bands used in the foregoing technologies are shared frequency bands, and various communications systems may operate these frequency bands. As a result, interference between devices in different systems or even devices in one system is quite severe, causing low spectrum utilization. To avoid or alleviate this problem, international organizations have stipulated that a device that uses an unlicensed frequency band needs to follow a listen-before-talk mechanism. Based on a basic principle of the listen-before-talk mechanism, in each communications system, its own specific listen-before-talk implementation solution is evolved. In a wireless fidelity (Wireless Fidelity, Wi-Fi) system, a listen-before-talk mechanism is also referred to as a carrier sense mechanism.

Carrier sense includes physical carrier sense and virtual carrier sense. The virtual carrier sense is also referred to as channel reservation or resource reservation. The virtual carrier sense is mainly used to avoid interference caused by a hidden node. As shown in FIG. 1, a device 1 transmits data to a device 2. Because a device 3 is relatively far away from the device 1, the device 3 cannot detect, through sensing, transmission performed by the device 1. Therefore, the device 3 may perform sending at the same time as the device 1 (for example, send data to the device 2), causing interference to reception performed by the device 2. In this case, the device 1 and the device 3 are hidden nodes to each other. The virtual carrier sense means: Before sending the data to the device 2, the device 1 first performs exchange of a resource reservation request/response message with the device 2, where the resource reservation request/response message carries expected duration of current transmission. After detecting, through sensing, the resource reservation response message sent by the device 2, the device 3 does not attempt to send data in the expected duration carried in the resource reservation response message, thereby avoiding the interference on the reception performed by the device 2.

In a resource reservation technology based on a virtual carrier sense mechanism in an existing Wi-Fi system, an access point (access point, AP) sends a broadcast frame, namely a multiple-user resource reservation request (multiple user-request to send, MU-RTS), and a plurality of target stations (station, STA) return resource reservation response messages (clear to send, CTS) after receiving the MU-RTS, so as to implement resource reservation. Specifically, when detecting that a channel is idle and keeps idle for distributed coordination function interframe space duration, the AP randomly selects a value from a predetermined range to set a backoff timer, and if the channel is continuously idle until the backoff timer is backed off to 0, the AP sends a resource reservation request MU-RTS frame; a target STA returns a CTS frame after receiving the MU-RTS; the AP sends a data frame after receiving the CTS frame; and the AP sends an acknowledgment message after receiving the data frame. Because both the MU-RTS and the CTS frame include a duration Duration field, after receiving the MU-RTS/CTS, a third-party device may set a network allocation vector (network allocation vector, NAV) of the third-party device based on the Duration field. Before the NAV is backed off to 0, the third-party device does not contend for the channel, thereby avoiding interference, caused by data sending performed by the third-party device, on transmission between a sending device and a receiving device.

However, the MU-RTS not only carries a remaining time duration of a current transmission process, but also includes an identifier of each target STA and a specific 20-MHz channel or some 20-MHz channels on which each target STA needs to return CTS. As a result, the MU-RTS has a relatively large frame length, and occupies a relatively large quantity of time-frequency resources, affecting a probability of correctly receiving the MU-RTS by the target STA. Consequently, transmission reliability is relatively low, and a resource reservation process may not be successfully completed.

SUMMARY

The present invention provides a resource reservation method and a related device, which can implement resource reservation, thereby increasing a success rate of data transmission.

According to a first aspect, an embodiment of the present invention provides a resource reservation method. The method includes: A network device generates a resource reservation request message RRQ. The RRQ includes one first resource reservation request message RRQ 1 and N second resource reservation request messages RRQs 2. The RRQ 1 includes first duration information. The first duration information is used to indicate that a time for which the network device occupies a target channel is first duration. The N RRQs 2 are respectively used to request N user equipments UEs to transmit data to the network device in the first duration. The N RRQs 2 are in a one-to-one correspondence with the N UEs. N is an integer greater than or equal to 1.

The network device sends the RRQ. The RRQ 1 is scrambled by using a first generic identifier. The N RRQs 2 are respectively scrambled by using unique identifiers of the UEs corresponding to the N RRQs 2. The first generic identifier is an identifier known to at least one third-party device and the N UEs.

In conclusion, in the prior art, identifier information of all target devices is directly carried in a resource reservation request message (or referred to as a resource reservation request frame), and consequently a frame length of the resource reservation request frame is excessively large, reducing a success rate of transmitting the resource reservation request frame. Compared with the prior art, in this embodiment of this application, a resource reservation request frame is divided into one RRQ 1 and a plurality of RRQs 2. The RRQ 1 is sent to a third-party device, and does not carry an identifier of a target device that performs data transmission subsequently, so that a length of the RRQ 1 is far less than that of the resource reservation request frame (for example, MU-RTS) in the prior art. This greatly increases a probability of correctly receiving the RRQ 1 by the third-party device. In addition, each RRQ 2 is corresponding to one target device, and each RRQ 2 carries only an identifier of a target device corresponding to the RRQ 2, so that a length of the RRQ 2 is far less than the resource reservation request frame (for example, MU-RTS) in the prior art. This greatly increases a probability of correctly receiving the RRQ 2 by the corresponding target device, and can implement resource reservation, thereby increasing a success rate of data transmission.

In a possible design, the RRQ 1 further includes a cell identity cell ID.

In this embodiment of this application, the cell identity cell ID is used to identify a cell in which UE that transmits data to the network device subsequently is located. If UE that receives the RRQ 1 determines, based on the cell ID, that a cell in which the UE is located is not the cell identified by the cell ID, the UE does not search for a second resource reservation request RRQ 2 in specific search space of the UE. In addition, the UE sets a network allocation vector NAV based on the time information included in the RRQ 1. Before the NAV is backed off to 0, the UE does not contend for a target channel. This avoids interference on data transmission on the target channel while reducing operating load of a processor of the UE.

In a possible design, the RRQ 1 is transmitted in common search space CSS, the N RRQs 2 are respectively transmitted in UE specific search space USS corresponding to the N UEs, and the CSS is search space known to both of the at least one third-party device and the N UEs.

In this embodiment of this application, the first resource reservation request RRQ 1 is transmitted in the common search space, so that a third-party device different from the target device that is to transmit data to the network device can also receive the RRQ 1. In this case, the third-party device can set a resource reservation timer based on the time information in the RRQ 1, to implement resource reservation. The N RRQs 2 are respectively transmitted in the specific search space of the UEs corresponding to the N RRQs 2, to reduce interference between transmission of the N RRQs 2, so that each UE can correctly receive an RRQ 2 corresponding to the UE, to prepare for subsequent data transmission. This can increase a success rate of data transmission.

In a possible design, the first generic identifier is a predefined radio network temporary identifier RNTI; or the first generic identifier is an RNTI that is notified by the network device to the at least one third-party device and the N UEs by using radio resource control RRC signaling or a system message; or the first generic identifier is an RNTI obtained through calculation based on first information, where the first information includes one or more of a cell identity, a system frame number, and a slot number of the RRQ 1.

In a possible design, the RRQ 1 and/or the RRQ 2 further include/includes indication information used to indicate whether UE corresponding to the RRQ 2 needs to send a resource reservation response message RRS to the network device.

In this embodiment of this application, if a resource reservation request carries indication information indicating that the UE corresponding to the RRQ 2 needs to return a resource reservation response message, but the UE does not return a resource reservation response message, the network device does not schedule data transmission of the UE, thereby avoiding a waste of resources; and if the resource reservation request carries indication information indicating that the UE corresponding to the RRQ 2 does not need to return a resource reservation response message, it indicates that the network device directly schedules data transmission of the UE subsequently. In this case, a time for returning the resource reservation response message is saved, thereby reducing a time of an entire data transmission process, and improving data transmission efficiency.

In a possible design, after the network device sends the RRQ, the method further includes: The network device receives RRSs sent by M UEs in the N UEs. Each of the M RRSs includes a first resource reservation response message RRS 1 and a second resource reservation response message RRS 2. The RRS 1 includes second duration information. The second duration information is used to indicate that a time for which the M UEs occupy the target channel is second duration. The RRS 2 is used to confirm to the network device that UE corresponding to the RRS 2 is to transmit data to the network device in the second duration. M is a positive integer less than or equal to N.

In this embodiment of this application, the RRS 1 carries the time information, so that the third-party device sets a resource reservation timer based on the time information after receiving the RRS 1, to implement resource reservation; and the RRS 2 is used to confirm to the network device that the UE corresponding to the RRS 2 is to transmit data to the network device in a time period included in the time information, thereby increasing a success rate of data transmission.

In a possible design, M RRSs 1 included in the M RRSs are all transmitted on a same time-frequency resource.

In this embodiment of this application, because content included in the M RRSs 1 is the same, there is no interference between transmission of the M RRSs 1 on a same time-frequency resource, and time-frequency resource occupation can be reduced, thereby reducing overheads.

In a possible design, M RRSs 2 included in the M RRSs are transmitted on different time-frequency resources.

In this embodiment of this application, the M RRSs 2 are transmitted on different time-frequency resources, so that when receiving an RRS 2, the network device can distinguish, based on a time-frequency resource occupied by the RRS, which UE returns the RRS 2. In addition, because content included in RRSs 2 returned by all the UEs is different from each other, interference between transmission of the RRSs 2 on different time-frequency resources is also avoided.

In a possible design, the RRS 1 is scrambled by using a second generic identifier, the M RRSs 2 are respectively scrambled by using unique identifiers corresponding to the M UEs, and the second generic identifier is known to the M UEs and the at least one third-party device.

In a possible design, the second generic identifier is a predefined RNTI; or the second generic identifier is an RNTI that is notified by the network device to the at least one third-party device and the M UEs; or the second generic identifier is an RNTI obtained through calculation based on second information, where the second information includes one or more of a cell identity, a system frame number, a slot number of the RRQ 1, and a slot number of the RRS 1.

In the foregoing embodiment, the RRS 1 is scrambled by using the generic identifier, so that the third-party device can receive the RRS 1, so as to avoid transmission interference caused by the third-party device.

In a possible design, the RRQ 1 includes indication information used to indicate time-frequency resources and/or transmission parameters used by the N UEs to transmit RRSs 1; or frequency domain resources used by the N UEs to transmit RRSs 1 are all the same as a frequency domain resource used by the network device to transmit the RRQ 1.

In a possible design, each of the N RRQs 2 includes indication information used to indicate a time-frequency resource and/or a transmission parameter used by corresponding UE in the N UEs to transmit an RRS 2 corresponding to the UE; or a frequency domain resource used by each of the N UEs to transmit an RRS 2 corresponding to the UE is the same as a frequency domain resource used for an RRQ 2 that is corresponding to the UE and that is in the N RRQs 2 transmitted by the network device; or the RRQ 1 includes indication information used to indicate transmission parameters respectively used by the N UEs to transmit N RRSs 2.

In a possible design, the second duration is shorter than the first duration, the second duration is equal to the first duration minus a first time interval, and the first time interval is a time interval between a moment at which the N UEs receive the RRQ 1 and a moment at which the N UEs complete sending of the RRSs 1.

In a possible design, the N RRQs 2 include one or more special RRQs 2, UE corresponding to the special RRQ 2 does not need to return a resource reservation response message RRS to the network device, and the special RRQ 2 includes indication information used to indicate a transmission resource and/or a transmission parameter for data transmission between the UE corresponding to the RRQ 2 and the network device.

In this embodiment of this application, when UE does not need to return a resource reservation response, the network device may indicate, in an RRQ 2 corresponding to the UE, scheduling information of subsequent data transmission of the UE, without additionally sending a dedicated data scheduling instruction to the UE. In this way, the time of the entire data transmission process can be reduced overall, thereby improving data transmission efficiency.

In a possible design, that the network device receives RRSs sent by M UEs in the N UEs includes the following:

When a time domain resource used by the network device to send the RRQ is a slot n, the network device receives, in a slot n+k, the RRSs sent by the M UEs in the N UEs, where n and n+k are slot numbers, and k is a predefined integer greater than or equal to zero, or k is an integer that is greater than or equal to zero and that is indicated by the network device in the RRQ 1 or the RRQ 2, or k is an integer that is greater than or equal to zero and that is indicated by the network device by using RRC signaling before the network device sends the RRQ.

This embodiment of this application is mainly used to indicate a time domain resource used by user equipment UE to send an RRS.

According to a second aspect, an embodiment of the present invention provides a resource reservation method. The method includes: User equipment UE receives a resource reservation request message RRQ sent by a network device. The RRQ includes a first resource reservation request message RRQ 1 and a second resource reservation request message RRQ 2. The RRQ 1 includes first duration information. The first duration information is used to indicate that a time for which the network device occupies a target channel is first duration. The RRQ 2 is used to request the UE to transmit data to the network device in the first duration. The RRQ 1 is scrambled by using a first generic identifier. The RRQ 2 is scrambled by using a unique identifier corresponding to the UE. The first generic identifier is an identifier known to the UE and at least one third-party device.

In a possible design, the RRQ 1 further includes a cell identity cell ID.

In a possible design, the RRQ 1 is transmitted in common search space CSS, the RRQ 2 is transmitted in UE specific search space USS, and the CSS is search space known to both of the at least one third-party device and the UE.

In a possible design, the first generic identifier is a predefined radio network temporary identifier RNTI; or the first generic identifier is an RNTI that is notified by the network device to the at least one third-party device and the UE by using radio resource control RRC signaling or a system message; or the first generic identifier is an RNTI obtained through calculation based on first information, where the first information includes one or more of a cell identity, a system frame number, and a slot number of the RRQ 1.

In a possible design, the RRQ 1 and/or the RRQ 2 further include/includes indication information used to indicate whether the UE needs to send a resource reservation response message RRS to the network device.

In a possible design, after the user equipment UE receives the RRQ sent by the network device, the method further includes the following:

The UE generates an RRS based on the RRQ. The RRS includes an RRS 1 and an RRS 2. The RRS 1 includes second duration information. The second duration information is used to indicate that a time for which the UE occupies the target channel is second duration. The RRS 2 is used to confirm to the network device that the UE is to transmit data to the network device in the second duration.

The UE sends the RRS to the network device.

In a possible design, the RRS 1 is scrambled by using a second generic identifier, the RRS 2 is scrambled by using a specific identifier corresponding to the UE, and the second generic identifier is known to M UEs and the at least one third-party device.

In a possible design, the second generic identifier is a predefined RNTI; or the second generic identifier is an RNTI that is notified by the network device to the at least one third-party device and the UE; or the second generic identifier is an RNTI obtained through calculation based on second information, where the second information includes one or more of a cell identity, a system frame number, a slot number of the RRQ 1, and a slot number of the RRS 1.

In a possible design, the RRQ 1 includes indication information used to indicate a time-frequency resource and/or a transmission parameter used by the UE to transmit the RRS 1; or a frequency domain resource used by the UE to transmit the RRS 1 is the same as a frequency domain resource used by the network device to transmit the RRQ 1.

In a possible design, the RRQ 2 includes indication information used to indicate a time-frequency resource and/or a transmission parameter used by the UE to transmit the RRS 2; or a frequency domain resource used by the UE to transmit the RRS 2 is the same as a frequency domain resource used by the network device to transmit the RRQ 2; or the RRQ 1 includes indication information used to indicate a transmission parameter used by the UE to transmit the RRS 2.

Different UEs transmit, by using different transmission resources, RRSs 2 corresponding to the UEs, so that the network device may determine, based on reception of an RRS 2, whether a current channel of corresponding UE is available, to schedule only data transmission of UEs whose channels are available, thereby avoiding a waste of resources caused by blind scheduling of data transmission.

In a possible design, the second duration is shorter than the first duration, the second duration is equal to the first duration minus a first time interval, and the first time interval is a time interval between a moment at which the UE receives the RRQ 1 and a moment at which the UE completes sending of the RRS 1.

In a possible design, when the UE does not need to return a resource reservation response message RRS to the network device, the RRQ 2 includes indication information used to indicate a transmission resource and/or a transmission parameter for data transmission between the UE and the network device.

In a possible design, that the UE sends the RRS to the network device includes: When the UE receives the RRQ in a slot n, the UE sends the RRS to the network device in a slot n+k, where n and n+k are slot numbers, and k is a predefined integer greater than or equal to zero, or k is an integer that is greater than or equal to zero and that is indicated by the network device in the RRQ 1 or the RRQ 2, or k is an integer that is greater than or equal to zero and that is indicated by the network device by using RRC signaling before the network device sends the RRQ.

According to a third aspect, an embodiment of the present invention provides a network device, where the network device includes:

a processing unit, configured to generate a resource reservation request message RRQ, where the RRQ includes one first resource reservation request message RRQ 1 and N second resource reservation request messages RRQs 2, the RRQ 1 includes first duration information, the first duration information is used to indicate that a time for which the network device occupies a target channel is first duration, the N RRQs 2 are respectively used to request N user equipments UEs to transmit data to the network device in the first duration, the N RRQs 2 are in a one-to-one correspondence with the N UEs, and N is an integer greater than or equal to 1; and a transceiver unit, configured to send the RRQ, where the RRQ 1 is scrambled by using a first generic identifier, the N RRQs 2 are respectively scrambled by using unique identifiers of the UEs corresponding to the N RRQs 2, and the first generic identifier is an identifier known to at least one third-party device and the N UEs.

In a possible design, the RRQ 1 further includes a cell identity cell ID.

In a possible design, the RRQ 1 is transmitted in common search space CSS, the N RRQs 2 are respectively transmitted in UE specific search space USS corresponding to the N UEs, and the CSS is search space known to both of the at least one third-party device and the N UEs.

In a possible design, the first generic identifier is a predefined radio network temporary identifier RNTI; or the first generic identifier is an RNTI that is notified by the network device to the at least one third-party device and the N UEs by using radio resource control RRC signaling or a system message; or the first generic identifier is an RNTI obtained through calculation based on first information, where the first information includes one or more of a cell identity, a system frame number, and a slot number of the RRQ 1.

In a possible design, the RRQ 1 and/or the RRQ 2 further include/includes indication information used to indicate whether UE corresponding to the RRQ 2 needs to send a resource reservation response message RRS to the network device.

In a possible design, the transceiver unit is further configured to: after sending the RRQ, receive RRSs sent by M UEs in the N UEs. Each of the M RRSs includes a first resource reservation response message RRS 1 and a second resource reservation response message RRS 2. The RRS 1 includes second duration information. The second duration information is used to indicate that a time for which the M UEs occupy the target channel is second duration. The RRS 2 is used to confirm to the network device that UE corresponding to the RRS 2 is to transmit data to the network device in the second duration. M is a positive integer less than or equal to N.

In a possible design, M RRSs 1 included in the M RRSs are all transmitted on a same time-frequency resource.

In a possible design, M RRSs 2 included in the M RRSs are transmitted on different time-frequency resources.

In a possible design, the M RRSs 1 are all scrambled by using a second generic identifier, the M RRSs 2 are respectively scrambled by using unique identifiers corresponding to the M UEs, and the second generic identifier is known to the M UEs and the at least one third-party device.

In a possible design, the second generic identifier is a predefined RNTI; or the second generic identifier is an RNTI that is notified by the network device to the at least one third-party device and the M UEs; or the second generic identifier is an RNTI obtained through calculation based on second information, where the second information includes one or more of a cell identity, a system frame number, a slot number of the RRQ 1, and a slot number of the RRS 1.

In a possible design, the RRQ 1 includes indication information used to indicate time-frequency resources and/or transmission parameters used by the N UEs to transmit RRSs 1; or frequency domain resources used by the N UEs to transmit RRSs 1 are all the same as a frequency domain resource used by the network device to transmit the RRQ 1.

In a possible design, each of the N RRQs 2 includes indication information used to indicate a time-frequency resource and/or a transmission parameter used by corresponding UE in the N UEs to transmit an RRS 2 corresponding to the UE; or a frequency domain resource used by each of the N UEs to transmit an RRS 2 corresponding to the UE is the same as a frequency domain resource used for an RRQ 2 that is corresponding to the UE and that is in the N RRQs 2 transmitted by the network device; or the RRQ 1 includes indication information used to indicate transmission parameters respectively used by the N UEs to transmit N RRSs 2.

In a possible design, the second duration is shorter than the first duration, the second duration is equal to the first duration minus a first time interval, and the first time interval is a time interval between a moment at which the N UEs receive the RRQ 1 and a moment at which the N UEs complete sending of the RRSs 1.

In a possible design, the N RRQs 2 include one or more special RRQs 2, UE corresponding to the special RRQ 2 does not need to return a resource reservation response message RRS to the network device, and the special RRQ 2 includes indication information used to indicate a transmission resource and/or a transmission parameter for data transmission between the UE corresponding to the RRQ 2 and the network device.

In a possible design, that the transceiver unit is configured to receive RRSs sent by M UEs in the N UEs is specifically:

when a time domain resource used to send the RRQ is a slot n, receiving, in a slot n+k, the RRSs sent by the M UEs in the N UEs, where n and n+k are slot numbers, and k is a predefined integer greater than or equal to zero, or k is an integer that is greater than or equal to zero and that is indicated by the network device in the RRQ 1 or the RRQ 2, or k is an integer that is greater than or equal to zero and that is indicated by the network device by using RRC signaling before the network device sends the RRQ.

According to a fourth aspect, an embodiment of the present invention provides user equipment UE, where the user equipment UE includes:

a transceiver unit, configured to receive a resource reservation request message RRQ sent by a network device, where the RRQ includes a first resource reservation request message RRQ 1 and a second resource reservation request message RRQ 2, the RRQ 1 includes first duration information, the first duration information is used to indicate that a time for which the network device occupies a target channel is first duration, the RRQ 2 is used to request the UE to transmit data to the network device in the first duration, the RRQ 1 is scrambled by using a first generic identifier, the RRQ 2 is scrambled by using a unique identifier corresponding to the UE, and the first generic identifier is an identifier known to the UE and at least one third-party device.

In a possible design, the RRQ 1 further includes a cell identity cell ID.

In a possible design, the RRQ 1 is transmitted in common search space CSS, the RRQ 2 is transmitted in UE specific search space USS, and the CSS is search space known to both of the at least one third-party device and the UE.

In a possible design, the first generic identifier is a predefined radio network temporary identifier RNTI; or the first generic identifier is an RNTI that is notified by the network device to the at least one third-party device and the UE by using radio resource control RRC signaling or a system message; or the first generic identifier is an RNTI obtained through calculation based on first information, where the first information includes one or more of a cell identity, a system frame number, and a slot number of the RRQ 1.

In a possible design, the RRQ 1 and/or the RRQ 2 further include/includes indication information used to indicate whether the UE needs to send a resource reservation response message RRS to the network device.

In a possible design, the user equipment UE further includes a processing unit.

The processing unit is configured to generate an RRS based on the RRQ after the transceiver unit receives the RRQ sent by the network device, where the RRS includes an RRS 1 and an RRS 2, the RRS 1 includes second duration information, the second duration information is used to indicate that a time for which the UE occupies the target channel is second duration, and the RRS 2 is used to confirm to the network device that the UE is to transmit data to the network device in the second duration.

The transceiver unit is further configured to send the RRS to the network device.

In a possible design, the RRS 1 is scrambled by using a second generic identifier, the RRS 2 is scrambled by using a specific identifier corresponding to the UE, and the second generic identifier is known to M UEs and the at least one third-party device.

In a possible design, the second generic identifier is a predefined RNTI; or the second generic identifier is an RNTI that is notified by the network device to the at least one third-party device and the UE; or the second generic identifier is an RNTI obtained through calculation based on second information, where the second information includes one or more of a cell identity, a system frame number, a slot number of the RRQ 1, and a slot number of the RRS 1.

In a possible design, the RRQ 1 includes indication information used to indicate a time-frequency resource and/or a transmission parameter used by the UE to transmit the RRS 1; or a frequency domain resource used by the UE to transmit the RRS 1 is the same as a frequency domain resource used by the network device to transmit the RRQ 1.

In a possible design, the RRQ 2 includes indication information used to indicate a time-frequency resource and/or a transmission parameter used by the UE to transmit the RRS 2; or a frequency domain resource used by the UE to transmit the RRS 2 is the same as a frequency domain resource used by the network device to transmit the RRQ 2; or the RRQ 1 includes indication information used to indicate a transmission parameter used by the UE to transmit the RRS 2.

In a possible design, the second duration is shorter than the first duration, the second duration is equal to the first duration minus a first time interval, and the first time interval is a time interval between a moment at which the UE receives the RRQ 1 and a moment at which the UE completes sending of the RRS 1.

In a possible design, when the UE does not need to return a resource reservation response message RRS to the network device, the RRQ 2 includes indication information used to indicate a transmission resource and/or a transmission parameter for data transmission between the UE and the network device.

In a possible design, that the transceiver unit is configured to send the RRS to the network device is specifically:

when the RRQ is received in a slot n, sending the RRS to the network device in a slot n+k, where n and n+k are slot numbers, and k is a predefined integer greater than or equal to zero, or k is an integer that is greater than or equal to zero and that is indicated by the network device in the RRQ 1 or the RRQ 2, or k is an integer that is greater than or equal to zero and that is indicated by the network device by using RRC signaling before the network device sends the RRQ.

According to a fifth aspect, an embodiment of the present invention provides a network device. The network device may include a memory, and a processor, a transmitter, and a receiver that are coupled to the memory. The transmitter is configured to support the network device in performing the step of sending information by the network device in the resource reservation method provided in the first aspect. The receiver is configured to support the network device in performing the step of receiving information by the network device in the resource reservation method provided in the first aspect. The transmitter and the receiver may be integrated as a transceiver. The processor is configured to support the network device in performing a processing step of the network device other than sending information and receiving information in the resource reservation method provided in the first aspect.

It should be noted that the transmitter and the receiver in this embodiment of the present invention may be integrated together, or may be coupled by using a coupler. The memory is configured to store code for implementing the resource reservation method described in the first aspect, and the processor is configured to execute the program code stored in the memory, to perform the resource reservation method provided in the first aspect or the resource reservation method in any one of the possible implementations provided in the first aspect. The memory and the processor may be integrated together, or may be coupled by using a coupler.

The processor is configured to execute program instructions stored in the memory, so that the network device performs the following operations:

generating a resource reservation request message RRQ, where the RRQ includes one first resource reservation request message RRQ 1 and N second resource reservation request messages RRQs 2, the RRQ 1 includes first duration information, the first duration information is used to indicate that a time for which the network device occupies a target channel is first duration, the N RRQs 2 are respectively used to request N user equipments UEs to transmit data to the network device in the first duration, the N RRQs 2 are in a one-to-one correspondence with the N UEs, and N is an integer greater than or equal to 1; and sending the RRQ by using the transceiver, where the RRQ 1 is scrambled by using a first generic identifier, the N RRQs 2 are respectively scrambled by using unique identifiers of the UEs corresponding to the N RRQs 2, and the first generic identifier is an identifier known to at least one third-party device and the N UEs.

In a possible design, the RRQ 1 further includes a cell identity cell ID.

In a possible design, the RRQ 1 is transmitted in common search space CSS, the N RRQs 2 are respectively transmitted in UE specific search space USS corresponding to the N UEs, and the CSS is search space known to both of the at least one third-party device and the N UEs.

In a possible design, the first generic identifier is a predefined radio network temporary identifier RNTI; or the first generic identifier is an RNTI that is notified by the network device to the at least one third-party device and the N UEs by using radio resource control RRC signaling or a system message; or the first generic identifier is an RNTI obtained through calculation based on first information, where the first information includes one or more of a cell identity, a system frame number, and a slot number of the RRQ 1.

In a possible design, the RRQ 1 and/or the RRQ 2 further include/includes indication information used to indicate whether UE corresponding to the RRQ 2 needs to send a resource reservation response message RRS to the network device.

In a possible design, the operations further include: after the RRQ is sent by using the transceiver, receiving, by using the transceiver, RRSs sent by M UEs in the N UEs. Each of the M RRSs includes a first resource reservation response message RRS 1 and a second resource reservation response message RRS 2. The RRS 1 includes second duration information. The second duration information is used to indicate that a time for which the M UEs occupy the target channel is second duration. The RRS 2 is used to confirm to the network device that UE corresponding to the RRS 2 is to transmit data to the network device in the second duration. M is a positive integer less than or equal to N.

In a possible design, M RRSs 1 included in the M RRSs are all transmitted on a same time-frequency resource.

In a possible design, M RRSs 2 included in the M RRSs are transmitted on different time-frequency resources.

In a possible design, the RRS 1 is scrambled by using a second generic identifier, the M RRSs 2 are respectively scrambled by using unique identifiers corresponding to the M UEs, and the second generic identifier is known to the M UEs and the at least one third-party device.

In a possible design, the second generic identifier is a predefined RNTI; or the second generic identifier is an RNTI that is notified by the network device to the at least one third-party device and the M UEs; or the second generic identifier is an RNTI obtained through calculation based on second information, where the second information includes one or more of a cell identity, a system frame number, a slot number of the RRQ 1, and a slot number of the RRS 1.

In a possible design, the RRQ 1 includes indication information used to indicate time-frequency resources and/or transmission parameters used by the N UEs to transmit RRSs 1; or frequency domain resources used by the N UEs to transmit RRSs 1 are all the same as a frequency domain resource used by the network device to transmit the RRQ 1.

In a possible design, each of the N RRQs 2 includes indication information used to indicate a time-frequency resource and/or a transmission parameter used by corresponding UE in the N UEs to transmit an RRS 2 corresponding to the UE; or a frequency domain resource used by each of the N UEs to transmit an RRS 2 corresponding to the UE is the same as a frequency domain resource used for an RRQ 2 that is corresponding to the UE and that is in the N RRQs 2 transmitted by the network device; or the RRQ 1 includes indication information used to indicate transmission parameters respectively used by the N UEs to transmit N RRSs 2.

In a possible design, the second duration is shorter than the first duration, the second duration is equal to the first duration minus a first time interval, and the first time interval is a time interval between a moment at which the N UEs receive the RRQ 1 and a moment at which the N UEs complete sending of the RRSs 1.

In a possible design, the N RRQs 2 include one or more special RRQs 2, UE corresponding to the special RRQ 2 does not need to return a resource reservation response message RRS to the network device, and the special RRQ 2 includes indication information used to indicate a transmission resource and/or a transmission parameter for data transmission between the UE corresponding to the RRQ 2 and the network device.

In a possible design, the receiving, by using the transceiver, RRSs sent by M UEs in the N UEs includes:

when a time domain resource used to send the RRQ by using the transceiver is a slot n, receiving, in a slot n+k by using the transceiver, the RRSs sent by the M UEs in the N UEs, where n and n+k are slot numbers, and k is a predefined integer greater than or equal to zero, or k is an integer that is greater than or equal to zero and that is indicated by the network device in the RRQ 1 or the RRQ 2, or k is an integer that is greater than or equal to zero and that is indicated by the network device by using RRC signaling before the network device sends the RRQ.

According to a sixth aspect, an embodiment of the present invention provides user equipment. The user equipment may include a memory, and a processor, a transmitter, and a receiver coupled to the memory. The transmitter is configured to support the user equipment in performing the step of sending information by the user equipment in the resource reservation method provided in the second aspect. The receiver is configured to support the user equipment in performing the step of receiving information by the user equipment in the resource reservation method provided in the second aspect. The transmitter and the receiver may be integrated as a transceiver. The processor is configured to support the user equipment in performing a processing step of the user equipment other than sending information and receiving information in the resource reservation method provided in the second aspect.

It should be noted that the transmitter and the receiver in this embodiment of the present invention may be integrated together, or may be coupled by using a coupler. The memory is configured to store code for implementing the resource reservation method described in the second aspect, and the processor is configured to execute the program code stored in the memory, to perform the resource reservation method provided in the second aspect or the resource reservation method in any one of the possible implementations provided in the second aspect. The memory and the processor may be integrated together, or may be coupled by using a coupler.

The processor is configured to execute program instructions stored in the memory, so that the UE performs the following operations:

receiving, by using the transceiver, a resource reservation request message RRQ sent by a network device. The RRQ includes a first resource reservation request message RRQ 1 and a second resource reservation request message RRQ 2. The RRQ 1 includes first duration information. The first duration information is used to indicate that a time for which the network device occupies a target channel is first duration. The RRQ 2 is used to request the UE to transmit data to the network device in the first duration. The RRQ 1 is scrambled by using a first generic identifier. The RRQ 2 is scrambled by using a unique identifier corresponding to the UE. The first generic identifier is an identifier known to the UE and at least one third-party device.

In a possible design, the RRQ 1 further includes a cell identity cell ID.

In a possible design, the RRQ 1 is transmitted in common search space CSS, the RRQ 2 is transmitted in UE specific search space USS, and the CSS is search space known to both of the at least one third-party device and the UE.

In a possible design, the first generic identifier is a predefined radio network temporary identifier RNTI; or the first generic identifier is an RNTI that is notified by the network device to the at least one third-party device and the UE by using radio resource control RRC signaling or a system message; or the first generic identifier is an RNTI obtained through calculation based on first information, where the first information includes one or more of a cell identity, a system frame number, and a slot number of the RRQ 1.

In a possible design, the RRQ 1 and/or the RRQ 2 further include/includes indication information used to indicate whether the UE needs to send a resource reservation response message RRS to the network device.

In a possible design, the operations further include: generating an RRS based on the RRQ after the RRQ sent by the network device is received by using the transceiver, where the RRS includes an RRS 1 and an RRS 2, the RRS 1 includes second duration information, the second duration information is used to indicate that a time for which the UE occupies the target channel is second duration, and the RRS 2 is used to confirm to the network device that the UE is to transmit data to the network device in the second duration; and sending the RRS to the network device by using the transceiver.

In a possible design, the RRS 1 is scrambled by using a second generic identifier, the RRS 2 is scrambled by using a specific identifier corresponding to the UE, and the second generic identifier is known to M UEs and the at least one third-party device.

In a possible design, the second generic identifier is a predefined RNTI; or the second generic identifier is an RNTI that is notified by the network device to the at least one third-party device and the UE; or the second generic identifier is an RNTI obtained through calculation based on second information, where the second information includes one or more of a cell identity, a system frame number, a slot number of the RRQ 1, and a slot number of the RRS 1.

In a possible design, the RRQ 1 includes indication information used to indicate a time-frequency resource and/or a transmission parameter used by the UE to transmit the RRS 1; or a frequency domain resource used by the UE to transmit the RRS 1 is the same as a frequency domain resource used by the network device to transmit the RRQ 1.

In a possible design, the RRQ 2 includes indication information used to indicate a time-frequency resource and/or a transmission parameter used by the UE to transmit the RRS 2; or a frequency domain resource used by the UE to transmit the RRS 2 is the same as a frequency domain resource used by the network device to transmit the RRQ 2; or the RRQ 1 includes indication information used to indicate a transmission parameter used by the UE to transmit the RRS 2.

In a possible design, the second duration is shorter than the first duration, the second duration is equal to the first duration minus a first time interval, and the first time interval is a time interval between a moment at which the UE receives the RRQ 1 and a moment at which the UE completes sending of the RRS 1.

In a possible design, when the UE does not need to return a resource reservation response message RRS to the network device, the RRQ 2 includes indication information used to indicate a transmission resource and/or a transmission parameter for data transmission between the UE and the network device.

In a possible design, the sending the RRS to the network device by using the transceiver includes:

when the RRQ is received in a slot n by using the transceiver, sending the RRS to the network device in a slot n+k by using the transceiver, where n and n+k are slot numbers, and k is a predefined integer greater than or equal to zero, or k is an integer that is greater than or equal to zero and that is indicated by the network device in the RRQ 1 or the RRQ 2, or k is an integer that is greater than or equal to zero and that is indicated by the network device by using RRC signaling before the network device sends the RRQ.

According to a seventh aspect, an embodiment of the present invention provides a resource reservation system, including one or more network devices and one or more user equipments. The network device may be the network device described in the third aspect or the fifth aspect, and the user equipment may be the user equipment described in the fourth aspect or the sixth aspect.

According to an eighth aspect, an embodiment of the present invention provides a computer-readable storage medium. The readable storage medium stores instructions, and when the instructions are run on a computer, the computer is enabled to perform the resource reservation method described in any one of the foregoing aspects.

According to a ninth aspect, an embodiment of the present invention provides a computer program product including instructions, and when the computer program product is run on a computer, the computer is enabled to perform the resource reservation method described in any one of the foregoing aspects.

According to a tenth aspect, an embodiment of the present invention provides a computer program including instructions, and when the computer program is run on a computer, the computer is enabled to perform the resource reservation method described in any one of the foregoing aspects.

According to an eleventh aspect, an embodiment of the present invention provides an apparatus. The apparatus may include a processor (there may be one or more processors) and one or more interfaces coupled to the processor. The processor may be configured to invoke, from a memory (the memory may be located in the apparatus, or located outside the apparatus and coupled to the apparatus), a program for implementing the resource reservation method provided in any one of the foregoing aspects, and execute instructions included in the program. The interface may be configured to output a processing result of the processor.

In a possible design, the apparatus is a chip or a system on a chip (System on a Chip, SoC).

In conclusion, in the prior art, identifier information of all target devices is directly carried in a resource reservation request message (or referred to as a resource reservation request frame), and consequently a frame length of the resource reservation request frame is excessively large, reducing a success rate of transmitting the resource reservation request frame. Compared with the prior art, in some embodiments of this application, a resource reservation request frame is divided into one RRQ 1 and a plurality of RRQs 2. The RRQ 1 is sent to a third-party device, and does not carry an identifier of a target device that performs data transmission subsequently, so that a length of the RRQ 1 is far less than that of the resource reservation request frame (for example, MU-RTS) in the prior art. This greatly increases a probability of correctly receiving the RRQ 1 by the third-party device. In addition, each RRQ 2 is corresponding to one target device, and each RRQ 2 carries only an identifier of a target device corresponding to the RRQ 2, so that a length of the RRQ 2 is far less than the resource reservation request frame (for example, MU-RTS) in the prior art. This greatly increases a probability of correctly receiving the RRQ 2 by the corresponding target device, and can implement resource reservation, thereby increasing a success rate of data transmission.

BRIEF DESCRIPTION OF DRAWINGS

The following briefly describes the accompanying drawings for embodiments of the embodiments of this application.

DESCRIPTION OF EMBODIMENTS

Figure 1:
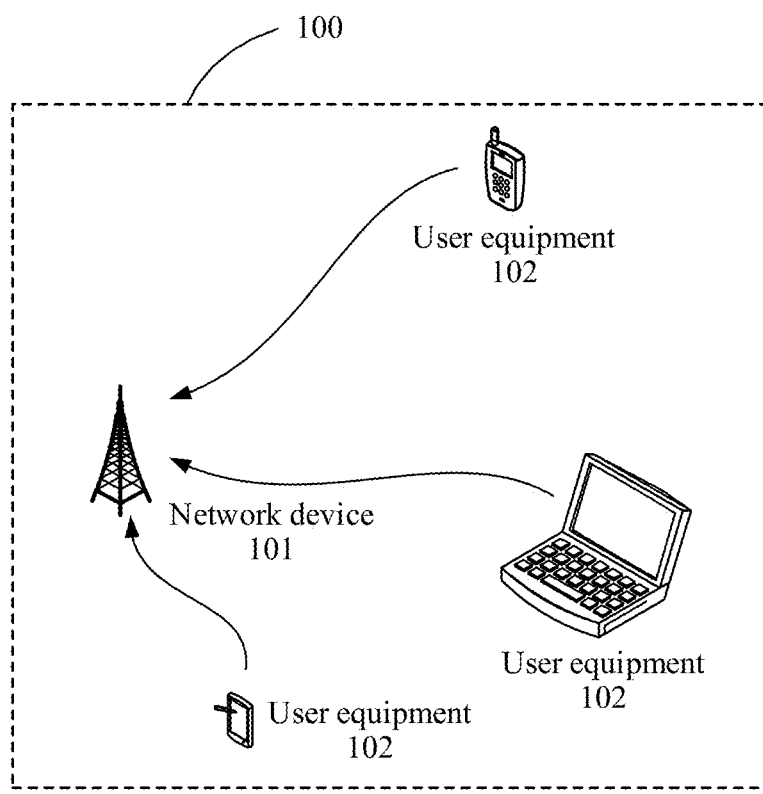
FIG. 1 is a schematic diagram of a system architecture used in a resource reservation method according to an embodiment of this application.

To make a person skilled in the art understand the solutions in the present invention better, the following describes the technical solutions in the embodiments of this application with reference to the accompanying drawings in the embodiments of this application.

The following provides detailed descriptions.

To better understand a resource reservation method, a device, a system, and a computer-readable storage medium provided in the embodiments of the present invention, the following first describes a system architecture that is used in a resource reservation method and that is applicable to the embodiments of the present invention. A system architecture 100 shown in FIG. 1 may include at least one network device 101 and a plurality of user equipments 102 (user equipment, UE). The network device 101 may transmit data to the user equipment 102, and the network device 101 allocates a transmission resource to the user equipment 102.

The network device 101 in the embodiments of this application may include network devices in various forms, for example, a macro base station, a micro base station (also referred to as a small cell), a relay station, an access point, and a cell (Cell). A base station used as an example may be an evolved NodeB (evolutional node B, eNB), and a next-generation node (next-generation Node B, gNB) in a 5G system or a new radio (new radio, NR) system. In addition, the base station may alternatively be a transmission/reception point (transmission receive point, TRP), a central unit (central unit, CU), or another network entity. In addition, in a scenario of a distributed base station, the network device 101 may be a baseband processing unit (baseband unit, BBU) and a radio frequency unit (remote radio unit, RRU);

and in a scenario of a cloud radio access network (cloud radio access network, CRAN), the network device 101 may be a baseband pool BBU pool and a radio frequency unit RRU. In addition, the network device 101 may alternatively be a core network (core network, CN) device, a mobility management entity (mobility management entity, MME) device, an access and mobility management function (access and mobility management function, AMF) device, or an Internet of Vehicles control function (control function, CF) device, a gateway (Gateway), a roadside unit (roadside unit, RSU), an operation, administration and maintenance (operation, administration and maintenance, OAM) device, an application server (APP server), or a third-party network device.

The user equipment 102 in the embodiments of this application is a device that can receive scheduling and indication information from the network device 101, and may be a device such as a mobile phone, a computer, a band, a smartwatch, a data card, a sensor, or a station (station, STA). These devices may be collectively referred to as a terminal device. For example, for a link between a band and a mobile phone in a link: band-mobile phone-base station, the band may be considered as user equipment 102, and the mobile phone may be considered as a network device 101.

In the present invention, a data sending device may be a network device 101, and a data receiving device may be user equipment 102; a data sending device is user equipment 102, and a data receiving device is a network device 101; or a data sending device is user equipment 102, and a data receiving device is also user equipment 102.

It should be noted that the terms "system" and "network" may be used interchangeably in the embodiments of this application. "A plurality of" means two or more. In view of this, "a plurality of" may also be understood as "at least two" in the embodiments of this application. The term "and/or" describes an association relationship for describing associated objects and represents that three relationships may exist. For example, A and/or B may represent the following three cases: Only A exists, both A and B exist, and only B exists. In addition, the character "/" generally indicates an "or" relationship between the associated objects.

It should be noted that a system architecture used in the resource reservation method provided in the embodiments of this application is not limited to the system architecture shown in FIG. 1.

Based on the foregoing system architecture, the following describes in detail the resource reservation request method provided in the embodiments of this application with reference to accompanying drawings.

Before sending data information to a receiving device, a sending device needs to first perform sensing on a target channel to detect whether the target channel is idle. The sending device can occupy the target channel for data transmission only when the target channel is idle and the sending device successfully obtains the target channel through contention.

The following provides a specific time sequence process from channel contention to data transmission by using an example.

Figure 2:
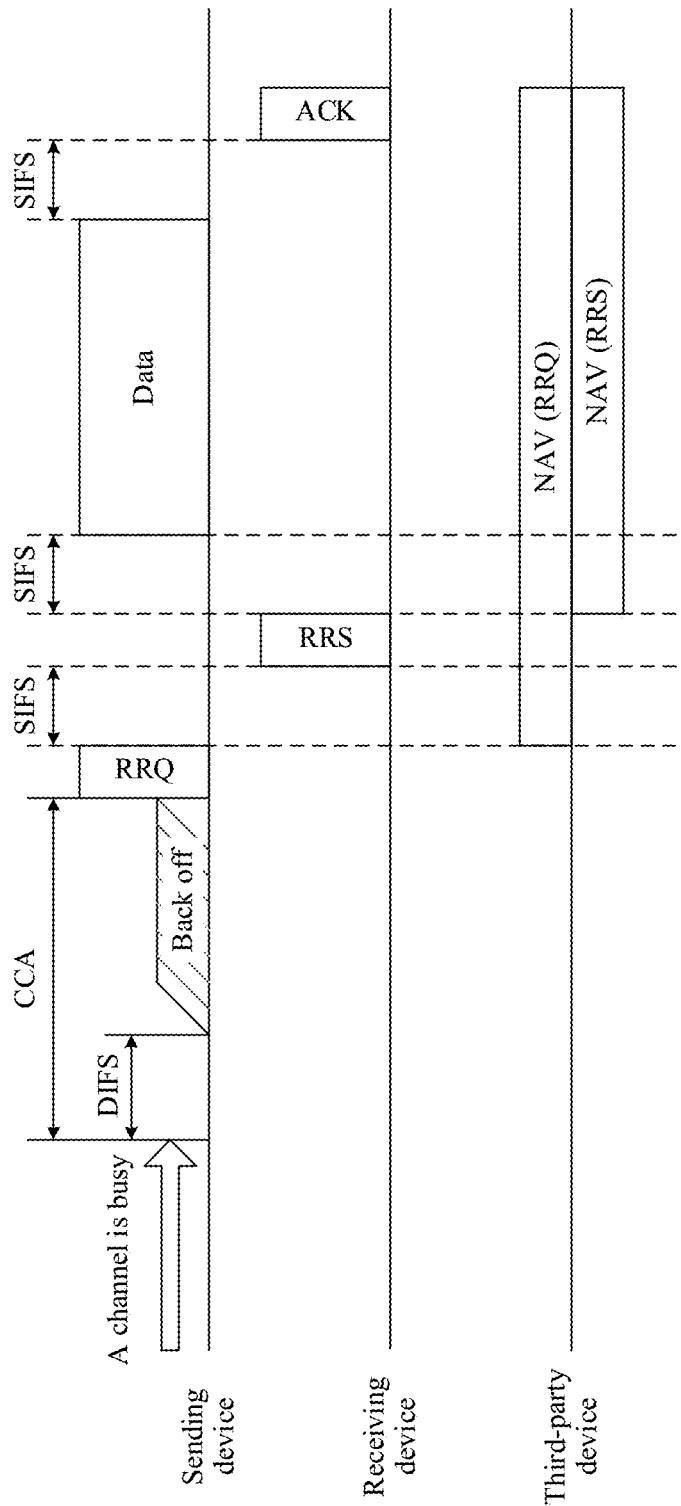
FIG. 2 is a schematic diagram of a time sequence process from performing channel contention to data transmission that are performed by a sending device according to an embodiment of this application.

FIG. 2 shows an example of a process in which a sending device contends for a channel. It can be learned that the sending device (for example, the sending device may be a network device) is in a continuous sensing state when a target channel is busy. When the sending device detects, through sensing, that the target channel is idle and an idle state is kept for first preset duration, that is, distributed coordination function interframe interval (distributed coordination function interframe space, DIFS) duration, the sending device performs a backoff (backoff) process, that is, the sending device randomly selects a value from a predetermined range to set a backoff timer and then the backoff timer starts countdown.

In the backoff process, the sending device continuously performs channel sensing and detection. If the target channel is continuously idle in a time period from a time at which the backoff timer starts to perform countdown to a time at which the backoff timer is backed off to 0, the sending device generates a resource reservation request message (resource request, RRQ), and sends the RRQ to a receiving device. This indicates that the sending device successfully obtains the target channel through contention. The RRQ sent by the sending device includes a Duration field used to indicate a remaining time of a current transmission process. The remaining time of the current transmission process is a time period in FIG. 2 from a time at which the sending device sends the RRQ to a time at which the receiving device sends an acknowledgment message (acknowledgement, ACK). After detecting the RRQ through sensing, a third-party device that performs sensing on the target channel obtains information about the Duration field in the RRQ, and then sets a network allocation vector (network allocation vector, NAV) of the third-party device based on the information about the Duration field. Before the NAV is backed off to 0, the third-party device does not contend for the target channel, thereby avoiding interference, caused by data sending performed by the third-party device, on transmission between the sending device and the receiving device.

A process corresponding to a time period from a time at which the sending device detects, through sensing, that the target channel is idle to a time at which the sending device sends the RRQ, that is, a total time period of the DIFS and a countdown time of the backoff timer, is a clear channel assessment (clear channel assessment, CCA) process. The process can effectively avoid a conflict on a radio channel.

After receiving the RRQ sent by the sending device, the receiving device returns a resource reservation response message (resource response, RRS) to the sending device after second preset duration, that is, short interframe space (short interframe space, SIFS) duration. The RRS also includes a Duration field, and a value of the Duration field is a value obtained by subtracting the SIFS and duration of the RRS from a value of the Duration field in the RRQ, as shown in FIG. 2. After detecting the RRS through sensing, the third-party device that performs sensing on the target channel obtains information about the Duration field in the RRS, and then sets a network allocation vector (network allocation vector, NAV) of the third-party device based on the obtained information about the Duration field. Before the NAV is backed off to 0, the third-party device does not contend for the target channel, thereby avoiding interference, caused by data sending performed by the third-party device, on transmission between the sending device and the receiving device.

After receiving the RRS, the sending device sends data to the receiving device after the SIFS duration. After receiving the data, the receiving device returns an ACK to the sending device after the SIFS duration. In this case, an entire process of contending for the target channel and performing data transmission by the sending device is completed.

In the embodiments of this application, an orthogonal frequency division multiple access (orthogonal frequency division multiple access, OFDMA) technology is used to transmit data. In other words, a network device may simultaneously send data information to a plurality of UEs.

Specifically, in the OFDMA technology, a transmission bandwidth may be divided into a series of orthogonal non-overlapping subcarrier sets, and different subcarrier sets are allocated to different users to implement multiple access. By using the OFDMA technology, an available bandwidth resource can be dynamically allocated to a user that needs the available bandwidth resource, so as to easily implement optimal utilization of a system resource. Because different users occupy non-overlapping subcarrier sets, in an ideal synchronization case, no multiple-user interference, that is, no multiple access interference (multiple access interference, MAI), occurs in a system.

Figure 3:
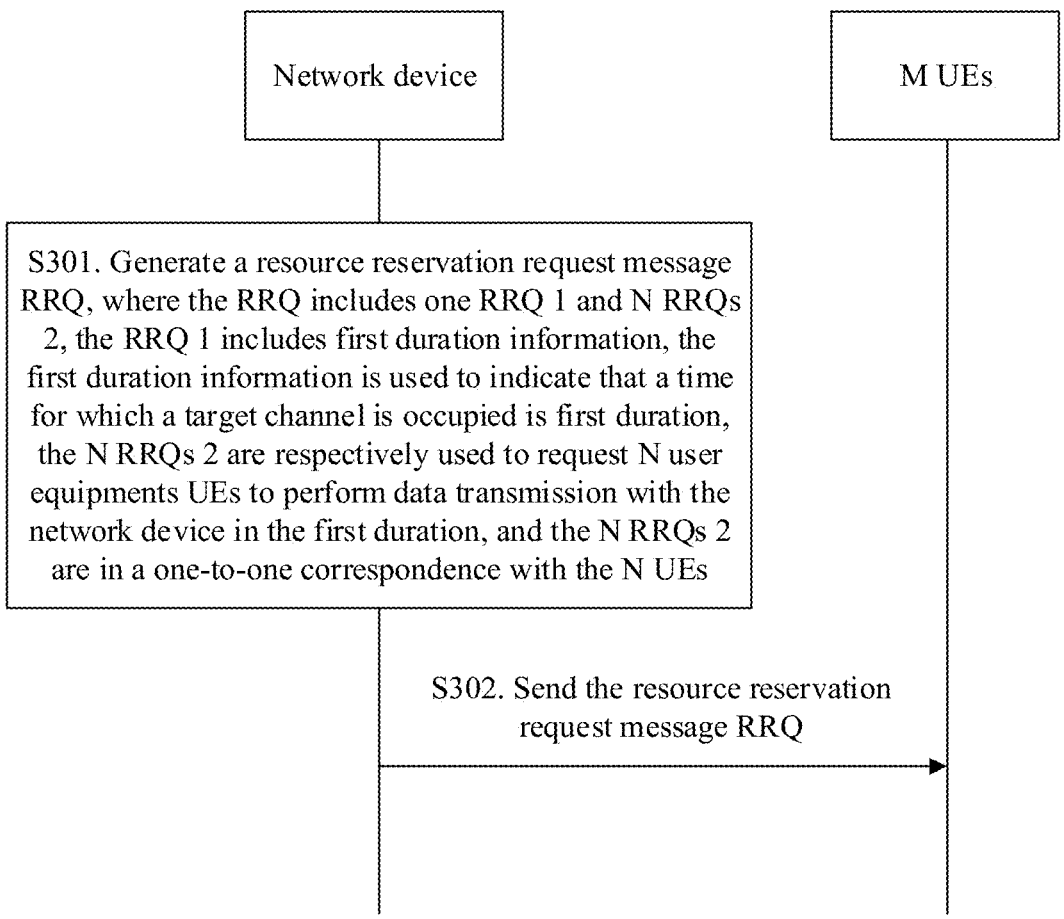
FIG. 3 is a schematic flowchart of a resource reservation method according to an embodiment of this application.

Based on the foregoing description, the following describes the resource reservation method provided in the embodiments of this application with reference to a schematic flowchart provided in FIG. 3. A method shown in FIG. 3 may include the following steps.

S301. A network device generates a resource reservation request message RRQ. The RRQ includes one RRQ 1 and N RRQs 2. The RRQ 1 includes first duration information. The first duration information is used to indicate that a time for which a target channel is occupied is first duration. The N RRQs 2 are respectively used to request N user equipments UEs to transmit data to the network device in the first duration. The N RRQs 2 are in a one-to-one correspondence with the N UEs.

After successfully obtaining the target channel through contention, the network device generates the resource reservation request message RRQ. The RRQ includes one first resource reservation request RRQ 1 and N (N>1) second resource reservation requests RRQs 2.

Specifically, the RRQ 1 includes the first duration information. The first duration information is used to indicate that a time for which the network device occupies the target channel is the first duration. Specifically, the first duration information is used to indicate, to a third-party device, that the time for which the network device occupies the target channel is the first duration. The N RRQs 2 are in a one-to-one correspondence with the N UEs, and are respectively used to request the N UEs to transmit data to the network device in the first duration. The third-party device may be a network device or UE that contends for the target channel other than the N UEs and the network device. The RRQ 1 includes the first duration information, so that the third-party device sets a resource reservation timer based on the first duration after detecting the RRQ 1 through sensing, to implement resource reservation.

Optionally, in addition to the first duration information, the RRQ 1 may further include one or more of the following information: a current cell identity (cell ID) and indication information used to indicate uplink or downlink transmission. This is because the RRQ is always sent by the network device regardless of whether data is finally transmitted from the network device to UE or from the UE to the network device. Therefore, whether uplink transmission or downlink transmission is to be scheduled subsequently needs to be indicated.

It should be noted that, after user equipment receives the RRQ 1 and obtains the first duration information and cell identity information in the RRQ 1, if the cell identity in the RRQ 1 is not an identity of a cell in which the user equipment is located, or in other words, a target cell corresponding to the RRQ sent by the network device is not the cell in which the user equipment is located, the user equipment does not attempt to receive an RRQ 2 in specific search space corresponding to the user equipment, but directly sets a network allocation vector (network allocation vector, NAV) based on the first duration information in the RRQ 1. Before the NAV is backed off to 0, the user equipment does not contend for the target channel. This avoids interference on data transmission on the target channel while reducing operating load of a processor of the user equipment.

S302. The network device sends the RRQ, and the N UEs receive the RRQ sent by the network device.

Specifically, the network device sends, in common search space (common search space, CSS), the RRQ 1 included in the RRQ, so that the N UEs and the third-party device each can detect and receive the RRQ 1. The network device correspondingly sends the N RRQs 2 respectively in specific search space (UE-specific search space, USS) corresponding to the N UEs, so that each of the N RRQs 2 can be searched for and received by only UE corresponding to USS in which the RRQ 2 exists.

The first resource reservation request RRQ 1 is transmitted in the common search space, so that a third-party device different from a target device that is to transmit data to the network device can also receive the RRQ 1. In this case, the third-party device can set a resource reservation timer based on the time information in the RRQ 1, to implement resource reservation. The N RRQs 2 are respectively transmitted in the specific search space of the UEs corresponding to the N RRQs 2, to reduce interference between transmission of the N RRQs 2, so that each UE can correctly receive an RRQ 2 corresponding to the UE, to prepare for subsequent data transmission. This can increase a success rate of data transmission.

Figure 4:
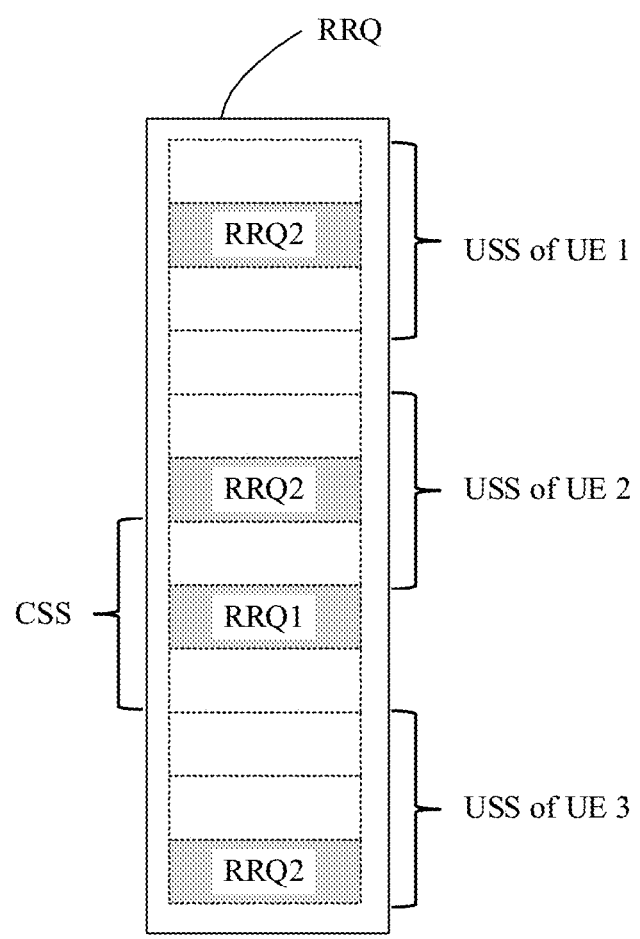
FIG. 4 is a schematic diagram of composition and resource allocation of a resource reservation request message according to an embodiment of this application.

For ease of understanding composition of the RRQ and transmission resource allocation of the RRQ, FIG. 4 is shown as an example. FIG. 4 is a diagram, provided by using an example in which N is 3, of composition and transmission resource allocation of an RRQ. Assuming that each small grid in FIG. 4 represents one transmission resource, small grids occupied by an RRQ 1 and three RRQs 2 in FIG. 4 respectively represent transmission resources used by the network device to correspondingly transmit the RRQ 1 and the three RRQs 2. It can be learned that the RRQ includes one RRQ 1 and three RRQs 2. The network device sends the RRQ 1 in common search space CSS, and respectively sends the three RRQs 2 in USS of UEs corresponding to the three RRQs 2. In a specific embodiment, CSS and USS may partially overlap. For example, in FIG. 4, the CSS and USS of UE 2 partially overlap, but partially overlapping search space does not affect search performed by the UE 2 for the RRQ. In addition, USS of different UEs may also partially overlap, but this does not affect normal detection of a corresponding RRQ 2 and correct obtaining of information in the corresponding RRQ 2 that are performed by any UE. This is because the RRQ 2 is scrambled by using a unique identifier of the corresponding UE and only the corresponding UE can descramble the RRQ 2 to obtain the corresponding information. The following describes scrambled content.

Scrambling is a digital signal processing method, and is multiplying an original signal by a scrambling code to obtain a new signal. Uplink scrambling is used to differentiate users, and downlink scrambling may be used to differentiate a cell and a channel.

The RRQ 1 is scrambled by using a generic identifier, and the generic identifier is an identifier known to the N UEs and the third-party device. For example, the generic identifier may be a radio network temporary identifier (radio network temporary identify/identifier, RNTI) predefined in a standard, may be an RNTI notified by the network device to the N UEs and the third-party device, or may be an RNTI obtained through calculation based on specific information.

The specific information may include one or more of the following information: a cell identity (cell ID), a current system frame number, and a slot number of the RRQ 1. Based on such design, the third-party device (that is, UE that is not in a target transmission range of an RRQ 2 in the current RRQ) can also receive the RRQ 1, to obtain the first duration in the RRQ 1, so as to set a resource reservation timer of the third-party device. Before the resource reservation timer is backed off to 0, the third-party device does not proactively contend for a channel, thereby avoiding interference on current transmission (transmission between the network device and the UE).

Each of the N RRQs 2 is scrambled by using a unique identifier of UE corresponding to the RRQ 2. The unique identifier of the UE may be, for example, an international mobile equipment identity (international mobile equipment identity, IMEI) of the UE, an international mobile subscriber identity (international mobile subscriber identification number, IMSI) of the UE, or a specific RNTI corresponding to the UE. The specific RNTI may be, for example, a cell radio network temporary identifier (cell radio network temporary identifier, C-RNTI).

Each of the N UEs receives the RRQ. However, because an RRQ 2 is scrambled by using a specific identifier of corresponding UE, only the UE can descramble the RRQ 2 to obtain information in the RRQ 2. Therefore, for the UE, the UE can correctly obtain only information in the RRQ 1 sent by the network device and the information in the RRQ 2 corresponding to the UE, but cannot correctly obtain information in other N−1 RRQs 2.

After receiving the RRQ sent by the network device, the N UEs need to send resource reservation response messages (resource response, RRS) to the network device, that is, need to return the RRSs to the network device, or may not need to send RRSs to the network device, that is, do not need to return the RRSs to the network device.

In a specific embodiment, whether UE that receives the RRQ needs to return an RRS to the network device may be predefined by using a standard. For example, the standard may specify that the UE has to return an RRS after receiving the RRQ. Alternatively, whether UE that receives the RRQ needs to return an RRS to the network device may be indicated by the network device in the RRQ. For example, the network device may indicate, in the RRQ 1 or an RRQ 2, whether the UE needs to return an RRS after receiving the RRQ. Alternatively, whether UE that receives the RRQ needs to return an RRS to the network device may be determined by the UE according to a predefined rule. For example, when the UE learns, through measurement, that a reference signal received power (reference signal receiving power, RSRP) of a downlink reference signal is greater than a threshold, the UE does not need to return an RRS; or otherwise, the UE needs to return an RRS.

If UE corresponding to an RRQ 2 needs to return a resource reservation response message RRS, but the UE does not return an RRS, the network device does not schedule data transmission of the UE, thereby avoiding a waste of resources. In other words, the network device schedules only data transmission of UE that has returned a resource reservation response message, thereby improving resource utilization efficiency. If UE corresponding to an RRQ 2 does not need to return a resource reservation response message, it indicates that the network device directly schedules data transmission of the UE subsequently. In this case, a time for returning the resource reservation response message is saved, thereby reducing a time of an entire data transmission process, and improving data transmission efficiency.

The following provides descriptions from two aspects in which an RRS needs to be returned and no RRS needs to be returned.

1. An RRS needs to be returned.

In one embodiment, after receiving the RRQ, UE needs to return an RRS to the network device that sends the RRQ, so as to indicate that the UE can transmit data to the network device. When the UE needs to return an RRS, if the network device does not receive the RRS returned by the UE, the network device considers that a current channel of the UE is busy and that the UE cannot transmit data to the network device. In this case, the network device does not schedule data transmission of the UE in a subsequent time.

It should be particularly noted that, although the N RRQs 2 in the RRQ from the network device are corresponding to the N UEs, in the N UEs, some UEs may not correctly receive corresponding RRQs 2, or some UEs cannot return RRSs because channels are busy. Therefore, the network device may receive only RRSs 2 returned by M UEs, where M<N. For UE that does not return an RRS, the network device does not schedule data transmission of the UE in a subsequent time, thereby avoiding a waste of transmission resources and improving utilization of transmission resources.

Figure 5:
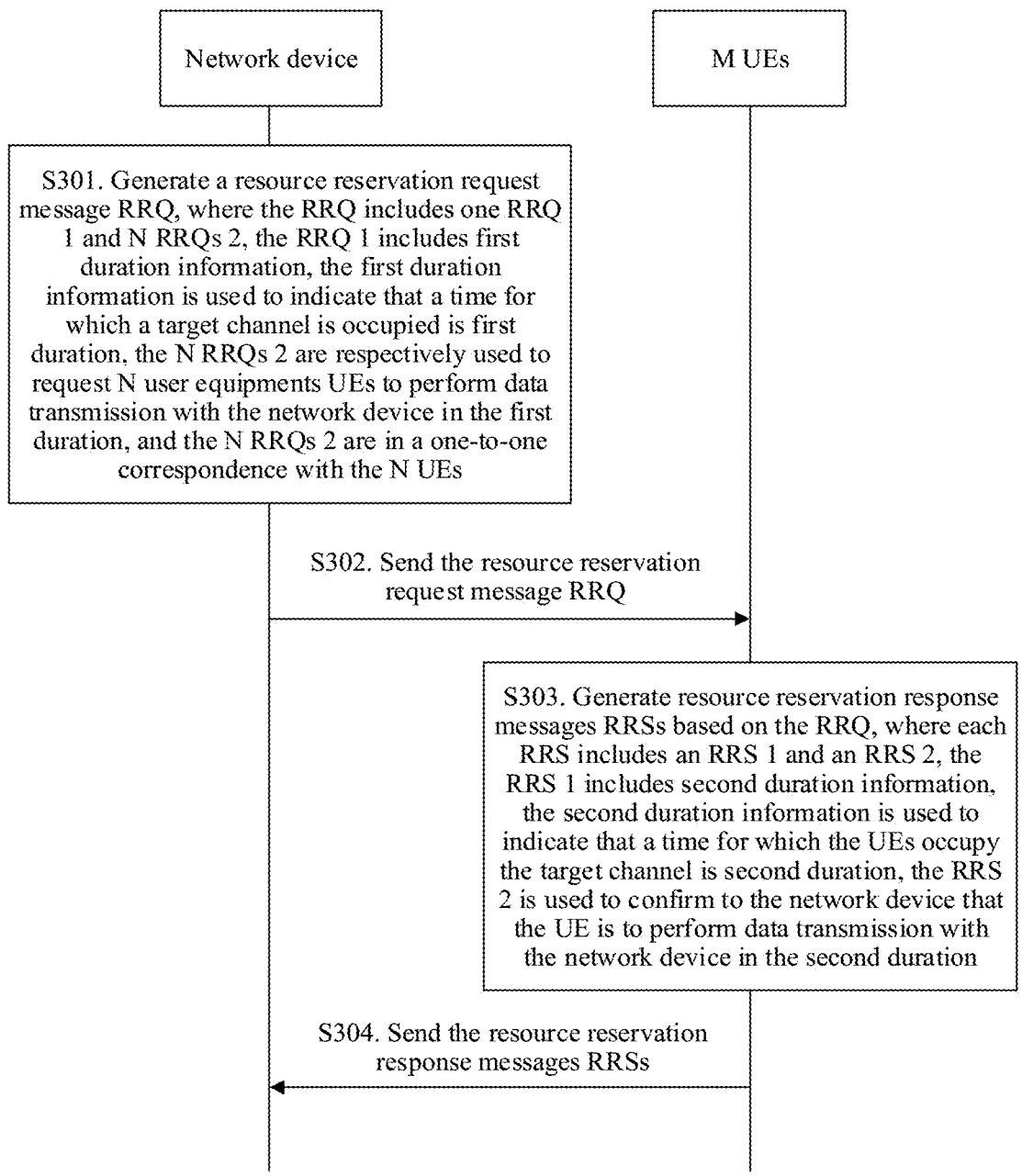
FIG. 5 is a schematic flowchart of another resource reservation method according to an embodiment of this application.

According to the foregoing description, if UE needs to return an RRS, after step S302, the following steps S303 and S304 are further included. For details, refer to FIG. 5.

S303. M UEs in the N UEs generate resource reservation response messages RRSs based on the RRQ. Each RRS includes an RRS 1 and an RRS 2. The RRS 1 includes second duration information. The second duration information is used to indicate that a time for which the M UEs occupy the target channel is second duration. The RRS 2 is used to confirm to the network device that UE corresponding to the RRS 2 is to transmit data to the network device in the second duration.

Specifically, the M UEs in the N UEs return the RRSs, and each of the M UEs generates a corresponding RRS based on the RRQ received by the UE. The RRS generated by each UE includes a first resource reservation response message RRS 1 and a second resource reservation response message RRS 2. The RRS 1 includes second duration information. The second duration information is used to indicate that the time for which the M UEs occupy the target channel is second duration. Specifically, the second duration information is used to indicate, to the third-party device, that the time for which the M UEs occupy the target channel is the second duration. The RRS 1 includes the second duration information, so that the third-party device sets a resource reservation timer based on the second duration after detecting the RRS 1 through sensing, to implement resource reservation. In addition, the RRS 2 is used to confirm to the network device that the UE corresponding to the RRS 2 is to transmit data to the network device in the second duration, thereby increasing a success rate of data transmission.

The second duration in the RRS 1 may be different from the first duration in the RRQ 1. The second duration may be duration obtained by subtracting a first time interval from the first duration. The first time interval is a time interval between a moment at which the M UEs receive the RRQ and a moment at which the M UEs send the corresponding RRSs to the network device. In a specific embodiment, time points at which the M UEs return the RRSs are the same, and the specific time point at which the M UEs return the RRSs may be predefined.

S304. The M UEs send the resource reservation response messages RRSs.

After generating the RRSs, the M UEs send the RRSs to the network device. Similar to the RRQ, the RRSs sent by the M UEs to the network device also need to be scrambled.

The RRS 1 is scrambled by using a generic identifier, and the generic identifier may be the same as or different from the generic identifier used for the RRQ 1. Similarly, the generic identifier used for the RRS 1 is an identifier known to the N UEs and the third-party device. For example, the generic identifier used for the RRS 1 may be a radio network temporary identifier (radio network temporary identify/identifier, RNTI) predefined in a standard, may be an RNTI notified by the network device to the N UEs and the third-party device, or may be an RNTI obtained through calculation based on specific information. The specific information may include one or more of the following information: a cell identity (cell ID), a current system frame number, a slot number of the RRQ 1, and a slot number of the RRS 1. Based on such design, the third-party device can also receive the RRS 1 to obtain the second duration in the RRS 1, so as to set a resource reservation timer of the third-party device. Before the resource reservation timer is backed off to 0, the third-party device does not proactively contend for a channel, thereby avoiding interference on current transmission (transmission between the network device and the UE).

The RRS 2 in the RRS is scrambled by using a unique identifier of the UE that returns the RRS. The unique identifier of the UE may be, for example, an international mobile equipment identity (international mobile equipment identity, IMEI) of the UE, an international mobile subscriber identity (international mobile subscriber identification number, IMSI) of the UE, or a specific RNTI corresponding to the UE. The specific RNTI may be, for example, a cell radio network temporary identifier (cell radio network temporary identifier, C-RNTI).

In addition, a transmission resource, that is, a time-frequency resource, is needed by the UE to return the RRS. The network device may indicate, in the RRQ, the transmission resource used by the UE to return the RRS.

Specifically, the network device may indicate, in the RRQ 1 that is sent, a transmission resource used by the UE to return the RRS 1. Certainly, the network device may further indicate, in the RRQ 1 that is sent, a transmission parameter used by the UE to return the RRS 1. The transmission parameter may be, for example, a modulation and coding scheme (Modulation and Coding Scheme, MCS). Similarly, the network device may indicate, in an RRQ 2 that is sent, a time-frequency resource used by the UE to return the RRS 2. Certainly, the network device may further indicate, in the RRQ 2, a transmission parameter used by the UE to return the RRS 2. For example, the transmission parameter may be an MCS. Alternatively, the network device may indicate, in the RRQ 1, transmission parameters used by all the UEs to return RRSs 2. The transmission parameters used by all the UEs to return the RRSs 2 may be the same or different. The transmission parameter used by the UE to return the RRS 2 may be, for example, an MCS. Transmission parameters used for the RRS 1 and the RRS 2 may alternatively be predefined. For example, the MCS as a transmission parameter may be predefined as QPSK, 16QAM, or 64QAM.

The transmission resource may include both a time domain resource and a frequency domain resource, or may include only a frequency domain resource. However, in a case in which the transmission resource includes only a frequency domain resource, a time domain resource for the RRS needs to be determined by using another method.

It should be noted that, because the RRQ includes only one RRQ 1, there is also only one transmission resource that is used for the RRS 1 and that is indicated in the RRQ 1. In other words, all the UEs return RRSs 1 by using a same transmission resource. In addition, time-frequency resource occupation can be reduced, thereby reducing overheads. However, to avoid interference and to make it easy for the network device to distinguish which UE returns an RRS, all the UEs return, by using transmission resources different from each other, the RRSs 2 corresponding to the UEs. It can be understood that, because all the UEs return the RRSs 1 by using a same transmission resource, to avoid interference, content of the RRSs 1 returned by all the UEs is the same, and time points at which the UEs return the RRSs 1 are the same.

Figure 6:
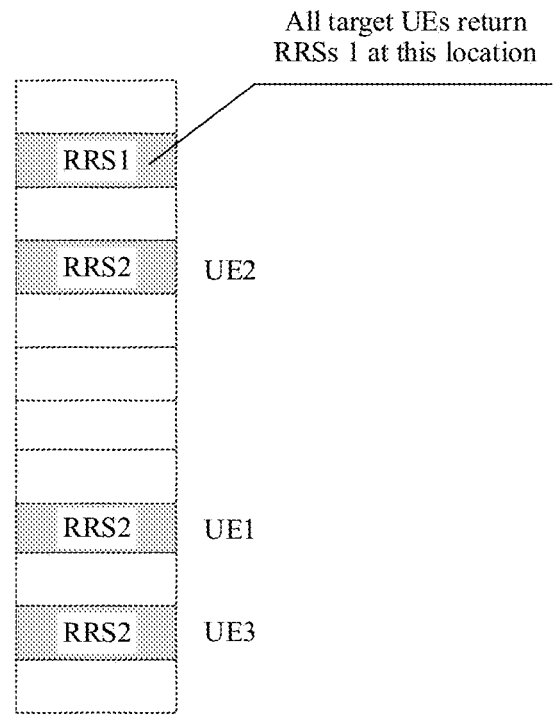
FIG. 6 is a schematic diagram of resource allocation of a resource reservation response message according to an embodiment of this application.

For example, refer to FIG. 6. Same as FIG. 4, FIG. 6 is also described by using an example in which N is 3. Assuming that each grid in FIG. 4 and FIG. 6 represents one transmission resource, the small grids occupied by the RRQ 1 and the three RRQs 2 in FIG. 4 respectively represent the transmission resources used by the network device to transmit the RRQ 1 and the three RRQs 2, and small grids occupied by an RRS 1 and three RRSs 2 in FIG. 6 represent transmission resources used by UEs specified by the network device to return RRSs. It can be learned that all the UEs return RRSs 1 by using a same transmission resource, but different UEs return the RRSs 2 by using different transmission resources.

In one implementation, the network device does not need to indicate, in the RRQ, a transmission resource used by UE to return an RRS, but generates a time-frequency resource for an RRS through mapping based on a time-frequency resource for the RRQ and a predefined rule. For example, a frequency domain resource used by the UE to return an RRS 1 may be the same as a frequency domain resource used by the network device to send the RRQ 1, and a frequency domain resource used by the UE to send an RRS 2 may be the same as a frequency domain resource used by the network device to send an RRQ 2 corresponding to the UE.

In addition, a time domain resource used by the UE to return the RRS may be specified. For example, if the UE receives the RRQ in a slot n (that is, the network device sends the RRQ in the slot n), the UE returns the RRS in a slot n+k (that is, the network device receives the RRS in the slot n+k), where n and n+k are slot numbers, and k may be a value predefined in a standard, or may be indicated by the network device to the UE in the RRQ 1 or the RRQ 2 or by using other signaling (for example, RRC signaling or a system message) in advance. In addition, k is an integer greater than or equal to 0.

Figure 7:
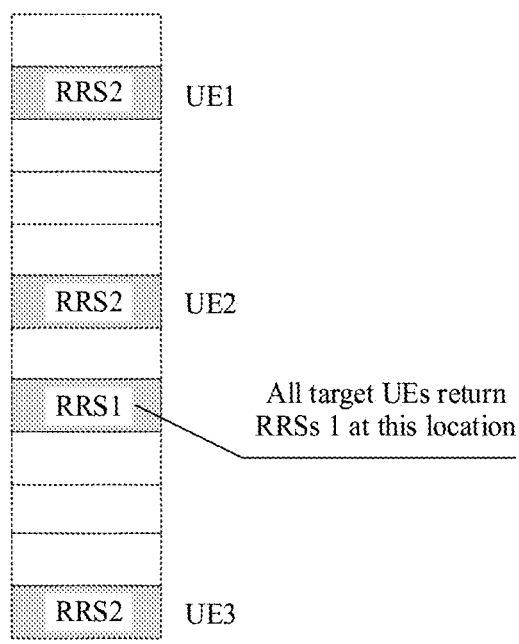
FIG. 7 is a schematic diagram of resource allocation of another resource reservation response message according to an embodiment of this application.

For example, refer to FIG. 7. Same as FIG. 4 and FIG. 6, FIG. 7 is also described by using an example in which N is 3. Similarly, if the small grids occupied by the RRQ 1 and the three RRQs 2 in FIG. 4 respectively represent the transmission resources used by the network device to transmit the RRQ 1 and the three RRQs 2, after UE 1, the UE 2, and UE 3 receive the RRQ 1 and the corresponding RRQs 2, transmission resources used to return corresponding RRSs are determined based on the transmission resources on which the RRQ 1 and the corresponding RRQs 2 exist. As shown in FIG. 7, transmission resources used by all UEs to return RRSs 1 are the same as a transmission resource used by the network device to transmit an RRQ 1, transmission resources used by the UE 1, the UE 2, and the UE 3 to respectively return RRSs 2 are the same as transmission resources used by the network device to transmit RRQs 2 corresponding to the UE 1, the UE 2, and the UE 3. It should be noted that the transmission resource in FIG. 7 may include only a frequency domain resource.

In this embodiment of this application, after receiving the RRS sent by the UE, the network device sends downlink control information (downlink control information, DCI) to schedule uplink or downlink data transmission of the corresponding UE. The DCI sent by the network device to the UE may include resource allocation information, hybrid automatic repeat request (hybrid automatic repeat request, HARQ) information, and/or power control information for uplink/downlink data transmission.

In the foregoing embodiment, the RRS 1 is scrambled by using the generic identifier, so that the third-party device can receive the RRS 1, so as to avoid transmission interference caused by the third-party device. In addition, all the UEs send the RRSs 1 by using a same transmission resource. In this case, a relatively small quantity of time-frequency resources are occupied, and therefore relatively low overheads are caused. Different UEs transmit, by using different transmission resources, RRSs 2 corresponding to the UEs, so that the network device may determine, based on reception of an RRS 2, whether a current channel of corresponding UE is available, to schedule only data transmission of UEs whose channels are available, thereby avoiding a waste of resources caused by blind scheduling of data transmission. In addition, compared with a prior-art method in which information from a plurality of STAs is carried in one message (MU-RTS), in this solution, the RRQs 2 are respectively sent to all the UEs, and a frame length of each RRQ 2 is far less than that of the MU-RTS. Therefore, transmission reliability is significantly improved, and resource reservation can be implemented, thereby increasing a success rate of data transmission.

2. No RRS needs to be returned.

When UE does not need to return an RRS, the network device may indicate, in an RRQ 2 sent to the UE, a transmission resource and/or a transmission parameter for data transmission of the UE, without sending dedicated DCI for transmission scheduling. In this way, a time of an entire data transmission process can be reduced overall, thereby improving data transmission efficiency. Specifically, the transmission parameter may be an MCS or the like.

In conclusion, in the prior art, identifier information of all target devices is directly carried in a resource reservation request message (or referred to as a resource reservation request frame), and consequently a frame length of the resource reservation request frame is excessively large, reducing a success rate of transmitting the resource reservation request frame. Compared with the prior art, in the embodiments of this application, a resource reservation request frame is divided into one RRQ 1 and a plurality of RRQs 2. The RRQ 1 is sent to a third-party device, and does not carry an identifier of a target device that performs data transmission subsequently, so that a length of the RRQ 1 is far less than that of the resource reservation request frame (for example, MU-RTS) in the prior art. This greatly increases a probability of correctly receiving the RRQ 1 by the third-party device. In addition, each RRQ 2 is corresponding to one target device, and each RRQ 2 carries only an identifier of a target device corresponding to the RRQ 2, so that a length of the RRQ 2 is far less than that of the resource reservation request frame (for example, MU-RTS) in the prior art. This greatly increases a probability of correctly receiving the RRQ 2 by the corresponding target device, and can implement resource reservation, thereby increasing a success rate of data transmission.

The foregoing mainly describes the solutions provided in the embodiments of this application from the perspective of interaction between a network device and user equipment. It can be understood that, to implement the foregoing functions, the network elements such as the network device and the user equipment include corresponding hardware structures and/or software modules for performing the functions. A person skilled in the art should be easily aware that, in combination with the examples described in the embodiments disclosed in this specification, network elements and algorithm steps may be implemented by using hardware or a combination of hardware and computer software in this application. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the network device, the user equipment, and the like may be divided into function modules based on the foregoing method examples. For example, each function module may be obtained through division based on each corresponding function, or two or more functions may be integrated into one processing module. The integrated module may be implemented in a form of hardware, or may be implemented in a form of a software functional module. It should be noted that, in the embodiments of this application, module division is an example and is merely a logical function division, and may be another division during actual implementation.

Figure 8:
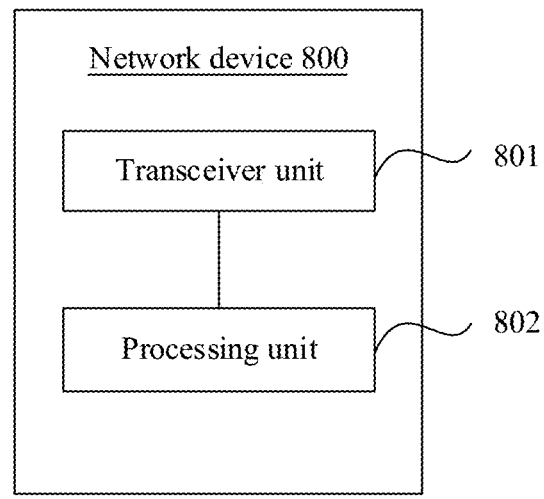
FIG. 8 is a schematic diagram of a logical structure of a network device according to an embodiment of this application.

When each function module is obtained through division based on each corresponding function, FIG. 8 is a possible schematic diagram of a logical structure of the network device in the foregoing embodiments. The network device 800 includes a transceiver unit 801 and a processing unit 802. For example, the transceiver unit 801 is configured to support the network device in performing the step of receiving information by the network device in the method embodiment shown in FIG. 3 or FIG. 5. The transceiver unit 801 is further configured to support the network device in performing the step of sending information by the network device in the method embodiment shown in FIG. 3 or FIG. 5. The processing unit 802 is configured to support the network device in performing the step of generating information by the network device in the method embodiment shown in FIG. 3 or FIG. 5, another function other than the function of the transceiver unit 801, and the like.

Optionally, the network device 800 may further include a storage unit, configured to store code (program) or data. In a possible manner, the processing unit 802 may invoke the code or data of the storage unit. Therefore, the network device 800 generates a resource reservation request message RRQ, where the RRQ includes one first resource reservation request message RRQ 1 and N second resource reservation request messages RRQs 2, the RRQ 1 includes first duration information, the first duration information is used to indicate that a time for which the network device occupies a target channel is first duration, the N RRQs 2 are respectively used to request N user equipments UEs to transmit data to the network device in the first duration, the N RRQs 2 are in a one-to-one correspondence with the N UEs, and N is an integer greater than or equal to 1. In addition, the network device 800 sends the RRQ, where the RRQ 1 is scrambled by using a first generic identifier, the N RRQs 2 are respectively scrambled by using unique identifiers of the UEs corresponding to the N RRQs 2, and the first generic identifier is an identifier known to at least one third-party device and the N UEs.

In terms of hardware implementation, the processing unit 802 may be a processor, a processing circuit, or the like. The transceiver unit 801 may be a transceiver, a transceiver circuit, an interface circuit, or the like. The storage unit may be a memory. The processing unit, the transceiver unit, and the storage unit may be integrated, or may be separated.

Figure 9:
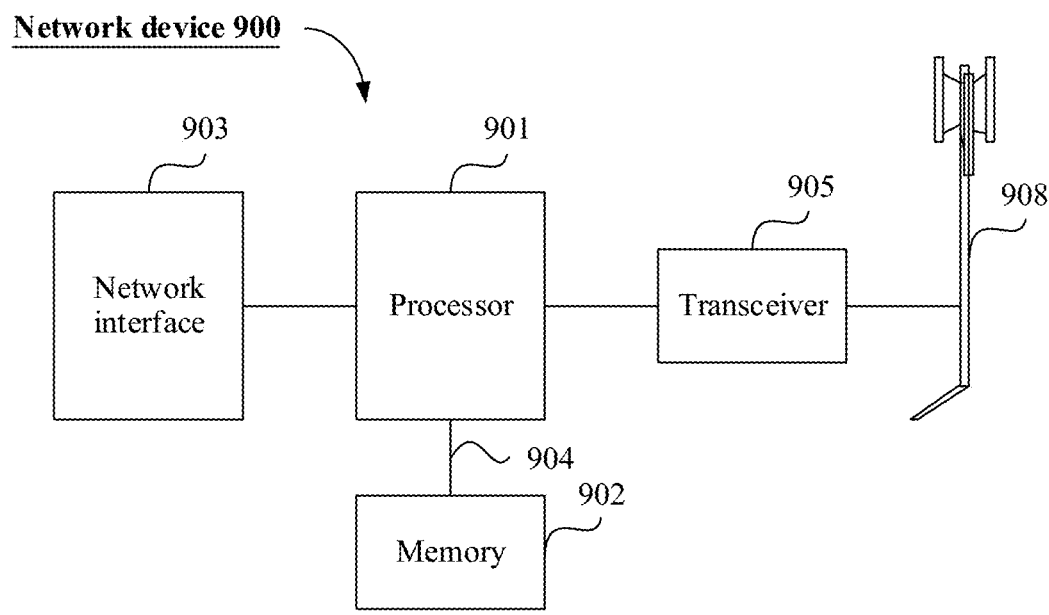
FIG. 9 is a schematic diagram of a hardware structure of a network device according to an embodiment of this application.

FIG. 9 is a possible schematic diagram of a hardware structure of the network device in the foregoing embodiments according to an embodiment of this application. As shown in FIG. 9, the network device 900 may include one or more processors 901, one or more memories 902, a network interface 903, one or more transceivers 905, and one or more antennas 908. These components may be connected through a bus 904 or in another manner. In FIG. 9, an example in which the components are connected through a bus is used.

The network interface 903 may be used by the network device 900 to communicate with another communications device, for example, another network device. Specifically, the network interface 903 may be a wired interface.

The transmitter 905 may be configured to perform transmission processing such as signal modulation on a signal that is output by the processor 901. The transceiver 905 may be further configured to perform receiving processing such as signal demodulation on a mobile communications signal received by the antenna 908. In some embodiments of this application, the transceiver 905 may be considered as a wireless transceiver. The network device 900 may include one or more transceivers 905. The antenna 908 may be configured to convert electromagnetic energy in a transmission line into an electromagnetic wave in free space, or convert an electromagnetic wave in free space into electromagnetic energy in a transmission line. There may be one or more antennas 908.

The memory 902 may be coupled to the processor 901 through the bus 904 or an input/output port, or the memory 902 may be integrated with the processor 901. The memory 902 is configured to store various software programs and/or a plurality of groups of instructions or data. Specifically, the memory 902 may include a high-speed random access memory, and may further include a nonvolatile memory, for example, one or more disk storage devices, a flash memory, or another nonvolatile solid-state storage device. The memory 902 may store an operating system (which is briefly referred to as a system below), for example, an embedded operating system such as uCOS, VxWorks, or RTLinux. The memory 902 may further store a network communications program. The network communications program may be used for communication with one or more attached devices, one or more user equipments, and one or more network devices.

The processor 901 may be a central processing unit, a general-purpose processor, a digital signal processor, an application-specific integrated circuit, a field programmable gate array or another programmable logic device, a transistor logic device, a hardware component, or any combination thereof. The processor may implement or execute various example logical blocks, modules, and circuits described with reference to content disclosed in this application. Alternatively, the processor may be a combination of processors implementing a determining function, for example, a combination of one or more microprocessors or a combination of a digital signal processor and a microprocessor.

In this embodiment of this application, the processor 901 may be configured to read and execute computer-readable instructions. Specifically, the processor 901 may be configured to invoke a program stored in the memory 902, for example, a program for implementing, on a side of the network device 900, the resource reservation method provided in one or more embodiments of this application, and execute instructions included in the program.

It can be understood that the network device 900 may be the network device 101 in the system 100 in the resource reservation method shown in FIG. 1, and may be implemented as a base transceiver station, a radio transceiver, a basic service set (BSS), an extended service set (ESS), a NodeB, an eNodeB, a gNB, or the like.

It should be noted that the network device 900 shown in FIG. 9 is merely an implementation of this embodiment of this application. During actual application, the network device 900 may further include more or fewer components. This is not limited herein. For specific implementation of the network device 900, refer to the related descriptions in the method embodiment shown in FIG. 3 or FIG. 5. Details are not described herein again.

Figure 10:
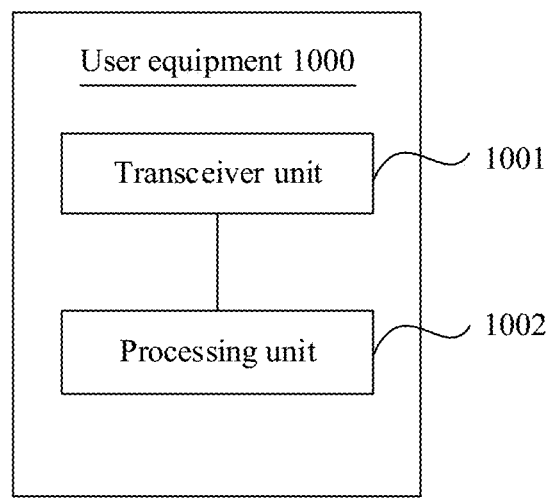
FIG. 10 is a schematic diagram of a logical structure of user equipment according to an embodiment of this application.

When each function module is obtained through division based on each corresponding function, FIG. 10 is a possible schematic diagram of a logical structure of the user equipment in the foregoing embodiments. The user equipment 1000 includes a transceiver unit 1001 and a processing unit 1002. For example, the transceiver unit 1001 is configured to support the user equipment in performing the step of receiving information by the user equipment in the method embodiment shown in FIG. 3 or FIG. 5. The transceiver unit 1001 is further configured to support the user equipment in performing the step of sending information by the user equipment in the method embodiment shown in FIG. 3 or FIG. 5. The processing unit 1002 is configured to support the user equipment in performing the step of generating information by the user equipment in the method embodiment shown in FIG. 3 or FIG. 5, another function other than the function of the transceiver unit 1001, and the like.

Optionally, the user equipment 1000 may further include a storage unit, configured to store code (program) or data. In a possible manner, the processing unit 1002 may invoke the code or data of the storage unit, so that the user equipment 1000 receives a resource reservation request message RRQ sent by a network device. The RRQ includes a first resource reservation request message RRQ 1 and a second resource reservation request message RRQ 2, the RRQ 1 includes first duration information, the first duration information is used to indicate that a time for which the network device occupies a target channel is first duration, the RRQ 2 is used to request the UE to transmit data to the network device in the first duration, the RRQ 1 is scrambled by using a first generic identifier, the RRQ 2 is scrambled by using a unique identifier corresponding to the UE, and the first generic identifier is an identifier known to the UE and at least one third-party device.

In terms of hardware implementation, the processing unit 1002 may be a processor, a processing circuit, or the like. The transceiver unit 1001 may be a transceiver, a transceiver circuit, an interface circuit, or the like. The storage unit may be a memory. The processing unit, the transceiver unit, and the storage unit may be integrated, or may be separated.

Figure 11:
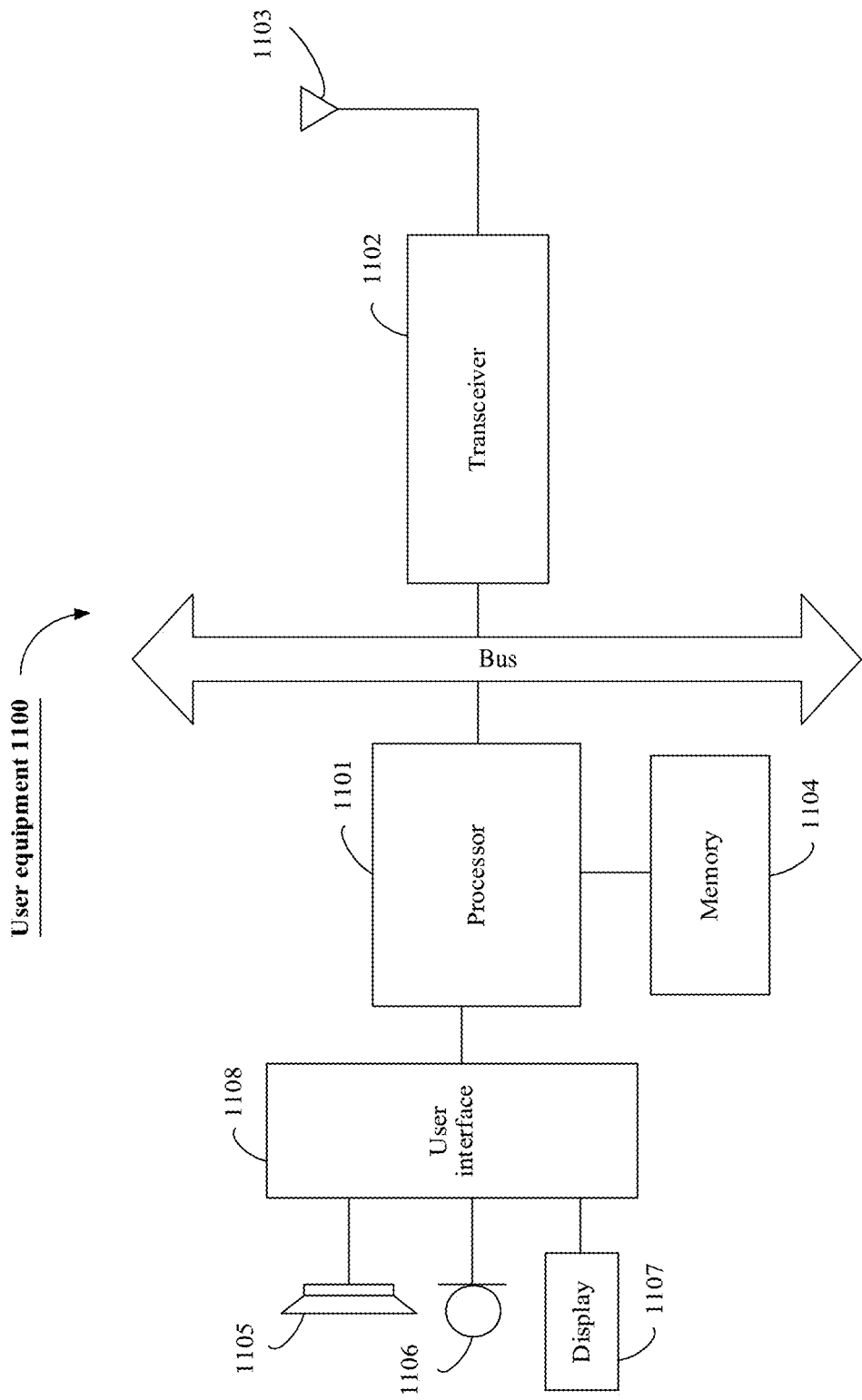
FIG. 11 is a schematic diagram of a hardware structure of user equipment according to an embodiment of this application.

FIG. 11 is a possible schematic diagram of a hardware structure of the user equipment in the foregoing embodiments according to an embodiment of this application. As shown in FIG. 11, the user equipment 1100 may include an input/output module (for example, an audio input/output module 1105, a key input module 1106, and a display 1107), a user interface 1108, one or more processors 1101, one or more transceivers 1102, one or more antennas 1103, and one or more memories 1104. These components may be connected through a bus or in another manner. In FIG. 11, an example in which the components are connected through a bus is used.

The antenna 1103 may be configured to convert electromagnetic energy into an electromagnetic wave in free space, or convert an electromagnetic wave in free space into electromagnetic energy in a transmission line. The transceiver 1102 may be configured to transmit a signal that is output by the processor 1101, or may be configured to receive a mobile communications signal received by the antenna 1103. In this embodiment of this application, the transceiver 1102 may be considered as a wireless transceiver. The user equipment 1100 may include one or more transceivers 1102.

In addition to the transceiver 1102 shown in FIG. 11, the user equipment 1100 may further include another communications component, for example, a GPS module, a Bluetooth (Bluetooth) module, or a wireless fidelity (wireless fidelity, Wi-Fi) module. In addition to the wireless communications signal described above, the user equipment 11000 may further support another wireless communications signal, for example, a satellite signal or a short wave signal. In addition to wireless communication, the user equipment 1100 may be further provided with a wired network interface (for example, a LAN interface) to support wired communication.

The input/output module may be configured to implement interaction between the user equipment 1100 and a user/an external environment, and may mainly include the audio input/output module 1105, the key input module 1106, the display 1107, and the like. Specifically, the input/output module may further include a camera, a touchscreen, a sensor, and the like. All the input/output modules communicate with the processor 1101 through the user interface 1108.

The memory 1104 may be coupled to the processor 1101 through the bus or an input/output port, or the memory 1104 may be integrated with the processor 1101. The memory 1104 is configured to store various software programs and/or a plurality of groups of instructions. Specifically, the memory 1104 may include a high-speed random access memory, and may further include a nonvolatile memory, for example, one or more disk storage devices, a flash memory, or another nonvolatile solid-state storage device. The memory 1104 may store an operating system (which is briefly referred to as a system below), for example, an embedded operating system such as ANDROID, IOS, WINDOWS, or LINUX. The memory 1102110 may further store a network communications program. The network communications program may be used for communication with one or more attached devices, one or more user equipments, and one or more network devices. The memory 1104 may further store a user interface program. The user interface program may vividly display content of an application through a graphical operation interface, and receive a control operation performed by a user on the application by using an input control such as a menu, a dialog box, and a key.

In this embodiment of this application, the memory 1104 may be configured to store a program for implementing, on a side of the user equipment 1100, the resource reservation method provided in one or more embodiments of this application. For implementation of the resource reservation method provided in the one or more embodiments of this application, refer to the foregoing embodiments.

The processor 1101 may be configured to read and execute computer-readable instructions. Specifically, the processor 1101 may be configured to invoke a program stored in the memory 1104, for example, a program for implementing, on the side of the user equipment 1100, the resource reservation method provided in one or more embodiments of this application, and execute the instructions included in the program, to perform the method in the foregoing embodiments. The processor 1101 may support one or more of global system for mobile communications (global system for mobile communication, GSM) (2G) communication, wideband code division multiple access (wideband code division multiple access, WCDMA) (3G) communication, long term evolution (long term evolution, LTE) (4G) communication, 5G communication, and the like. Optionally, when the processor 1101 sends any message or data, the processor 1101 specifically drives or controls the transceiver 1102 to perform sending. Optionally, when the processor 1101 receives any message or data, the processor 1101 specifically drives or controls the transceiver 1102 to perform receiving. Therefore, the processor 1101 may be considered as a control center for performing sending or receiving, and the transceiver 1102 is a specific executor for performing sending and receiving operations.

It can be understood that the user equipment 1100 may be the user equipment 102 in the system 100 in the resource reservation method shown in FIG. 1, and may be implemented as an eMTC device, a mobile device, a mobile station (mobile station), a mobile unit (mobile unit), a wireless unit, a remote unit, a user agent, a mobile client, or the like.

It should be noted that the user equipment 1100 shown in FIG. 11 is merely an implementation of this embodiment of this application. During actual application, the user equipment 1100 may further include more or fewer components. This is not limited herein. For specific implementation of the user equipment 1100, refer to the related descriptions in the method embodiment shown in FIG. 3 or FIG. 5. Details are not described herein again.

Figure 12:
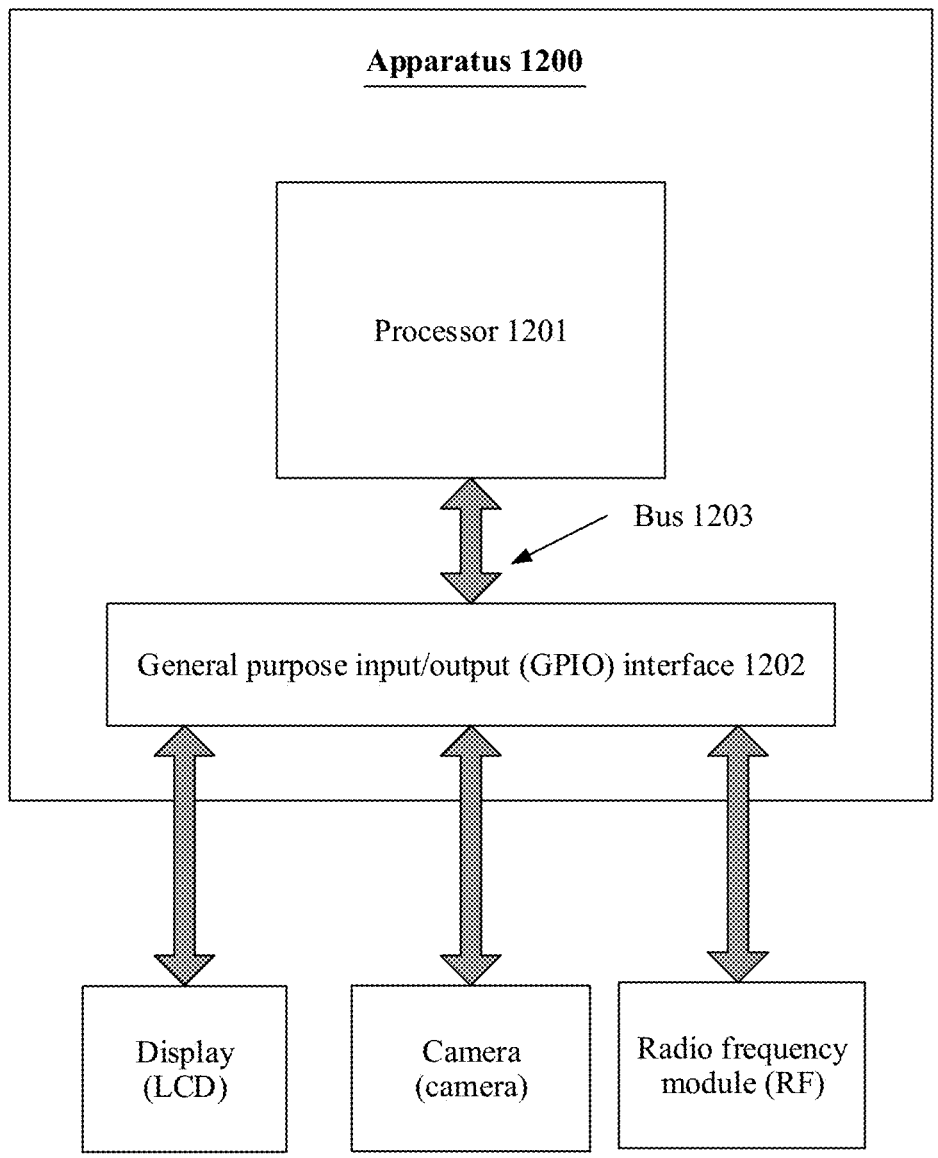
FIG. 12 is a schematic structural diagram of a communications chip according to an embodiment of this application.

FIG. 12 is a schematic structural diagram of an apparatus according to this application. As shown in FIG. 12, the apparatus 1200 may include a processor 1201 and one or more interfaces 1202 coupled to the processor 1201.

The processor 1201 may be configured to read and execute computer-readable instructions. During specific implementation, the processor 1201 may mainly include a controller, an arithmetic unit, and a register. The controller is mainly responsible for decoding an instruction, and sends a control signal for an operation corresponding to the instruction. The arithmetic unit is mainly responsible for performing a fixed-point or floating-point arithmetic operation, a shift operation, a logic operation, and the like, or may perform an address operation and address conversion. The register is mainly responsible for storing a quantity of register operations, intermediate operation results, and the like that are temporarily stored during instruction execution. During specific implementation, a hardware architecture of the processor 1201 may be an application-specific integrated circuit (application specific integrated circuits, ASIC) architecture, a microprocessor without interlocked pipeline stages (microprocessor without interlocked piped stages architecture, MIPS) architecture, an advanced reduced instruction set computing machines (advanced RISC machines, ARM) architecture, an NP architecture, or the like. The processor 1201 may be single-core, or may be multi-core.

The interface 1202 may be configured to input to-be-processed data to the processor 1201, and may output a processing result of the processor 1201 to the outside. During specific implementation, the interface 1202 may be a general-purpose input/output (general purpose input output, GPIO) interface, and may be connected to a plurality of peripheral devices (for example, a display (LCD), a camera (camera), and a radio frequency (radio frequency, RF) module). The interface 1202 may be connected to the processor 1201 through a bus 1203.

In this application, the processor 1201 may be configured to invoke a program in the memory for implementing, on a side of the network device or a side of the user equipment, the resource reservation method provided in one or more embodiments of this application, and execute instructions included in the program. The memory may be integrated with the processor 1201. In this case, the memory is used as a part of the apparatus 1200. Alternatively, the memory is used as an external element of the apparatus 1200, and the processor 1201 invokes, through the interface 1202, instructions or data stored in the memory.

The interface 1202 may be configured to output an execution result of the processor 1201. For the resource reservation method provided in one or more embodiments of this application, refer to the foregoing embodiments. Details are not described herein again.

The apparatus 1200 may be a communications chip or a system on a chip (System on a Chip, SoC).

It should be noted that functions respectively corresponding to the processor 1201 and the interface 1202 may be implemented by using a hardware design, or may be implemented by using a software design, or may be implemented by using a combination of software and hardware. This is not limited herein.

Still another aspect of this application provides a resource reservation system. The resource reservation system includes one or more network devices and one or more user equipments. The network device may be the network device in FIG. 8 or FIG. 9, and the user equipment may be the device in FIG. 10 or FIG. 11.

All or some of the foregoing embodiments may be implemented by using software, hardware, firmware, or any combination thereof. When the software is used to implement the embodiments, the embodiments may be implemented fully or partially in a form of a computer program product. The computer program product includes one or more computer instructions. When the computer program instructions are loaded and executed on a computer, the procedure or functions according to the embodiments of the present invention are all or partially generated. The computer may be a general-purpose computer, a special-purpose computer, a computer network, or another programmable apparatus. The computer instructions may be stored in a computer-readable storage medium, or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive solid state disk (SSD)), or the like.

In conclusion, the foregoing descriptions are merely example embodiments of the present invention, but are not intended to limit the protection scope of the present invention. Any modification, equivalent replacement, or improvement made within the spirit and principle of the present invention shall fall within the protection scope of the present invention.

What is claimed is:

1. A method implemented by a network device, wherein the method comprises:
    performing a first scramble of a first resource reservation request (RRQ 1) using a first generic identifier known to a third-party device and N user equipments (UEs), wherein the RRQ 1 comprises first duration information indicating a first duration for which the network device occupies a target channel;
    performing a second scramble of N second RRQs (RRQs 2) using one or more first unique identifiers of the N UEs corresponding to the N RRQs 2, wherein the N RRQs 2 request the N UEs to transmit data to the network device during the first duration, wherein the N RRQs 2 are in a one-to-one correspondence with the N UEs, and wherein N is an integer greater than or equal to generating, after the first scramble and the second scramble, an RRQ comprising the RRQ 1 and the N RRQs 2; and
    sending the RRQ.

2. The method of claim 1, wherein the RRQ 1 further comprises a cell identity (ID).

3. The method of claim 1, further comprising:
    transmitting the RRQ 1 in a common search space (CSS), wherein the CSS is known to both the third-party device and the N UEs; and
    transmitting the N RRQs 2 in a UE specific search space (USS) corresponding to the N UEs.

4. The method of claim 1, wherein the first generic identifier is:
    a predefined radio network temporary identifier (RNTI);
    a first RNTI that is notified by the network device to the third-party device and the N UEs using Radio Resource Control (RRC) signaling or a system message; or
    a second RNTI based on calculation with first information, wherein the first information comprises one or more of a cell identity (ID), a system frame number, and a slot number of the RRQ 1.

5. The method of claim 1, wherein the RRQ 1 or each of the N RRQs 2 further comprises indication information indicating whether each of the N UEs corresponding to each of the N RRQs 2 needs to send a resource reservation response message (RRS) to the network device.

6. The method of claim 1, wherein after sending the RRQ, the method further comprises receiving, from M UEs in the N UEs, M resource reservation response messages (RRSs), wherein each of the M RRSs comprises a first resource reservation response message (RRS 1) and a second resource reservation response message (RRS 2), wherein the RRS 1 comprises second duration information indicating that a time for which the M UEs occupy the target channel is a second duration, wherein the RRS 2 confirms to the network device that a UE corresponding to the RRS 2 is to transmit data to the network device during the second duration, and wherein M is a positive integer less than or equal to N.

7. The method of claim 6, further comprising receiving M RRSs 2 comprised in the M RRSs on different time-frequency resources.

8. The method of claim 6, wherein each of M RRSs 1 in the M RRSs is scrambled using a second generic identifier known to the M UEs and the third-party device, and wherein M RRSs 2 in the M RRSs are scrambled using respective second unique identifiers corresponding to the M UEs.

9. The method of claim 8, wherein the second generic identifier is:
a predefined radio network temporary identifier (RNTI);
a first RNTI that is notified by the network device to the third-party device and the M UEs; or
a second RNTI based on calculation with second information, wherein the second information comprises one or more of a cell identity (ID), a system frame number, a first slot number of the RRQ 1, and a second slot number of the RRS 1.

10. The method of claim 6, wherein:
the RRQ 1 comprises indication information indicating time-frequency resources or transmission parameters to be used by the N UEs to transmit the RRSs 1; or
first frequency domain resources used by the N UEs to transmit the RRSs 1 are same as a second frequency domain resource used by the network device to transmit the RRQ 1.

11. The method of claim 6, wherein:
each of the N RRQs 2 comprises first indication information indicating a time-frequency resource or a transmission parameter used by a corresponding UE in the N UEs to transmit an RRS 2 corresponding to the corresponding UE;
a first frequency domain resource used by each of the N UEs to transmit the RRS 2 corresponding to the corresponding UE is same as a second frequency domain resource used by the network device for transmitting an RRQ 2 in the N RRQs 2 corresponding to the corresponding UE; or
the RRQ 1 comprises second indication information indicating transmission parameters to be used by the N UEs to transmit N RRSs 2.

12. The method of claim 6, wherein the second duration is less than the first duration, wherein the first duration is equal to a sum of the second duration and a first time interval, and wherein the first time interval is a time interval between a first moment when the N UEs receive the RRQ 1 and a second moment when the N UEs complete sending the RRSs 1.

13. The method of claim 6, further comprising:
identifying that a time domain resource to send the RRQ is a slot n; and
receiving, in response to the identifying and in a slot n+k, the RRSs from the M UEs, wherein n and n+k are slot numbers, and wherein k is:
a predefined integer greater than or equal to zero;
an integer that is greater than or equal to zero and that is indicated by the network device in the RRQ 1 or an RRQ 2 in the N RRQs 2; or
an integer that is greater than or equal to zero and that is indicated by the network device using Radio Resource Control (RRC) signaling before the network device sends the RRQ.

14. The method of claim 1, wherein the N RRQs 2 comprise one or more special RRQs 2, wherein each UE of the N UEs corresponding to the one or more special RRQs 2 does not return a resource reservation response message (RRS) to the network device, and wherein each of the one or more special RRQs 2 comprises indication information indicating a transmission resource or a transmission parameter for data transmission between the UE corresponding to the one or more special RRQs 2 and the network device.

15. A method implemented by a user equipment (UE), wherein the method comprises:
receiving, from a network device, a resource reservation request message (RRQ) comprising a first RRQ (RRQ 1) and a second RRQ (RRQ 2),
wherein the RRQ 1 comprises first duration information indicating a first duration for which the network device occupies a target channel, wherein the RRQ 1 is scrambled based on a first generic identifier known to the UE and a third-party device,
wherein the RRQ 2 requests the UE to transmit data to the network device during the first duration, and wherein the RRQ 2 is scrambled based on a unique identifier corresponding to the UE.

16. The method of claim 15, wherein the RRQ 1 further comprises a cell identity (ID).

17. The method of claim 15, further comprising:
receiving the RRQ 1 in a common search space (CSS), wherein the CSS is known to both of the third-party device and the UE; and
receiving the RRQ 2 in a UE specific search space (USS) corresponding to the UE.

18. The method of claim 15, wherein after receiving the RRQ, the method further comprises:
generating, based on the RRQ, a resource reservation response message (RRS) comprising an RRS 1 and an RRS 2, wherein the RRS 1 comprises second duration information indicating that a time for which the UE occupies the target channel is a second duration, and wherein the RRS 2 to confirms to the network device that the UE is to transmit the data to the network device during the second duration; and
sending the RRS to the network device.

19. The method of claim 18, further comprising:
scrambling the RRS 1 using a second generic identifier, wherein the second generic identifier is known to the UE and the third-party device; and
scrambling the RRS 2 using a specific identifier corresponding to the UE.

20. A user equipment (UE) comprising:
a memory configured to store program instructions; and
a processor coupled to the memory, wherein the program instructions cause the processor to be configured to:
receive, from a network device, a resource reservation request message (RRQ) comprising a first RRQ (RRQ 1) and a second RRQ (RRQ 2),
wherein the RRQ 1 comprises first duration information indicating a first duration for which the network device occupies a target channel, wherein the RRQ 1 is scrambled based on a first generic identifier known to the UE and a third-party device,
wherein the RRQ 2 requests the UE to transmit data to the network device during the first duration, and wherein the RRQ 2 is scrambled based on a unique identifier corresponding to the UE.

* * * * *

UNITED STATES PATENT AND TRADEMARK OFFICE
CERTIFICATE OF CORRECTION

PATENT NO. : 12,010,560 B2
APPLICATION NO. : 17/423007
DATED : June 11, 2024
INVENTOR(S) : Zhenguo Du and Hongcheng Zhuang It is certified that error appears in the above-identified patent and that said Letters Patent is hereby corrected as shown below:

On the Title Page

Page 2, item (56) References Cited, Foreign Patent Documents: "IN 108476530 A 8/2018" should read "CN 108476530 A 8/2018"

In the Claims

Claim 1, Column 32, Line 28: "to generating, after" should read "to 1; generating, after"

Signed and Sealed this
Sixth Day of August, 2024

Katherine Kelly Vidal
Director of the United States Patent and Trademark Office